United States Patent
Harsh et al.

(10) Patent No.: US 11,346,698 B2
(45) Date of Patent: May 31, 2022

(54) COMPACT PRESSURE AND FLOW SENSORS FOR VERY HIGH TEMPERATURE AND CORROSIVE FLUIDS

(71) Applicant: SPORIAN MICROSYSTEMS, INC., Lafayette, CO (US)

(72) Inventors: Kevin Harsh, Erie, CO (US); Jon Lubbers, Lafayette, CO (US); Evan Pilant, Longmont, CO (US); Alex Brand, Westminster, CO (US); Laura Ferlin, Erie, CO (US); Samuel Hotaling, Boulder, CO (US); Steve Sheeran, Longmont, CO (US); Jakob Oreskovich, Boulder, CO (US); Eric Schneider, Thornton, CO (US); Thomas Schahrer, Longmont, CO (US); Lewis Wright, Polson, MT (US)

(73) Assignee: Sporian Microsystems, Inc., Lafayette, CO (US)

( * ) Notice: Subject to any disclaimer, the term of this patent is extended or adjusted under 35 U.S.C. 154(b) by 66 days.

(21) Appl. No.: 16/901,834

(22) Filed: Jun. 15, 2020

(65) Prior Publication Data

US 2020/0400477 A1    Dec. 24, 2020

Related U.S. Application Data

(60) Provisional application No. 62/865,026, filed on Jun. 21, 2019.

(51) Int. Cl.
*G01F 15/14*    (2006.01)
*G01L 19/06*    (2006.01)
(Continued)

(52) U.S. Cl.
CPC ............ *G01F 15/14* (2013.01); *G01F 1/69* (2013.01); *G01F 1/76* (2013.01); *G01L 9/0075* (2013.01); *G01L 19/0681* (2013.01)

(58) Field of Classification Search
CPC ... G01F 15/14; G01F 1/69; G01F 1/76; G01F 1/34; G01F 23/16; G01F 15/006;
(Continued)

(56) References Cited

U.S. PATENT DOCUMENTS 3,244,000 A    4/1966 Ballard
4,287,553 A *  9/1981 Braunlich ............ G01D 5/2417
                                                    361/283.4

(Continued)

FOREIGN PATENT DOCUMENTS

CN    109269681 A    1/2019
EP    2525218 A1    11/2012
(Continued)

OTHER PUBLICATIONS

Bull, Kevin, "Methods of Accurately Measuring Capacitive RH Sensors," Veriteq Instruments, Inc., Richmond BC, Canada, 5th International Symposium on Humidity and Moisture—ISHM 2006 Brazil, May 2-5, 2006—Rio de Janeiro, Brazil.
(Continued)

*Primary Examiner* — Francis C Gray
(74) *Attorney, Agent, or Firm* — James R. Young; Cochran Freund & Young LLC

(57) ABSTRACT

Heat resistant sensors equipped with any of a variety of transducers for measuring any of a variety of properties of fluids are constructed with components comprising materials that can withstand very high temperatures. Some embodiments of the sensors include a first pressure sensitive element and a second pressure sensitive element with respective first and second membranes positioned in juxta-
(Continued)

posed relation to each other to form a capacitor. Some embodiments include a pusher that extends from the membrane toward a first electrode. Some embodiments have a housing comprising a ceramic substrate with a sensor element mounted on an inside surface of the substrate. Other embodiments have direction sensing capabilities including a heater positioned in a core material and at least three temperature sensors located at or near the peripheral surface of the core material and spaced apart angularly in relation to each other.

25 Claims, 23 Drawing Sheets

(51) Int. Cl.
*G01F 1/76* (2006.01)
*G01F 1/69* (2006.01)
*G01L 9/00* (2006.01)

(58) Field of Classification Search
CPC ... G01F 15/00; G01L 9/0075; G01L 19/0681; G01L 11/002; G01L 19/0092
See application file for complete search history.

(56) References Cited

U.S. PATENT DOCUMENTS

| | | | |
|---|---|---|---|
| 5,316,619 A * | 5/1994 | Mastrangelo | G01L 9/0073 438/53 |
| 6,109,113 A * | 8/2000 | Chavan | G01L 9/0073 73/706 |
| 6,672,171 B2 | 1/2004 | Gu et al. | |
| 8,847,576 B1 | 9/2014 | Hanning et al. | |
| 8,928,329 B2 | 1/2015 | Downing et al. | |
| 9,445,202 B1 | 9/2016 | Chyzhov | |
| 2003/0033884 A1* | 2/2003 | Beekhuizen | G01L 9/0075 73/718 |
| 2003/0132418 A1 | 7/2003 | Kwon et al. | |
| 2010/0127832 A1 | 5/2010 | Pischek et al. | |
| 2015/0145074 A1 | 5/2015 | Kolb et al. | |
| 2015/0268115 A1 | 9/2015 | Robert et al. | |
| 2017/0328800 A1* | 11/2017 | Li | G01L 9/0072 |
| 2018/0172535 A1 | 6/2018 | Harsh et al. | |

FOREIGN PATENT DOCUMENTS

| | | | | |
|---|---|---|---|---|
| JP | 04089562 A | | 3/1992 | |
| JP | 3620795 B2 | * | 2/2005 | ........... B81B 7/0006 |
| MA | 893676 A2 | * | 7/1999 | ......... G01L 19/0092 |
| WO | WO-8304308 A | * | 5/1983 | ............... G01L 9/12 |
| WO | WO-2019030121 A1 | * | 2/2019 | ........... G01L 9/0042 |

OTHER PUBLICATIONS

Martin, Jeremy et al. "Integration of SICN as a Low k Etch Stop and Cu Passivation in a High Performance Cu/Low k Interconnect." Advanced Micro Devices, AMD/Motorola Alliance, 3501 Ed Bluestein Blvd., Austin, TX 78721 / Motorola, Dan Noble Center, 3501 Ed Bluestein Blvd., Austin, TX 78721.

* cited by examiner

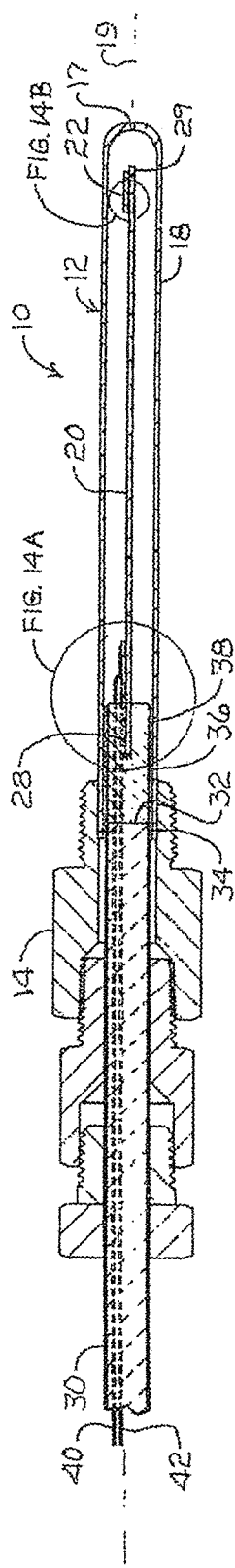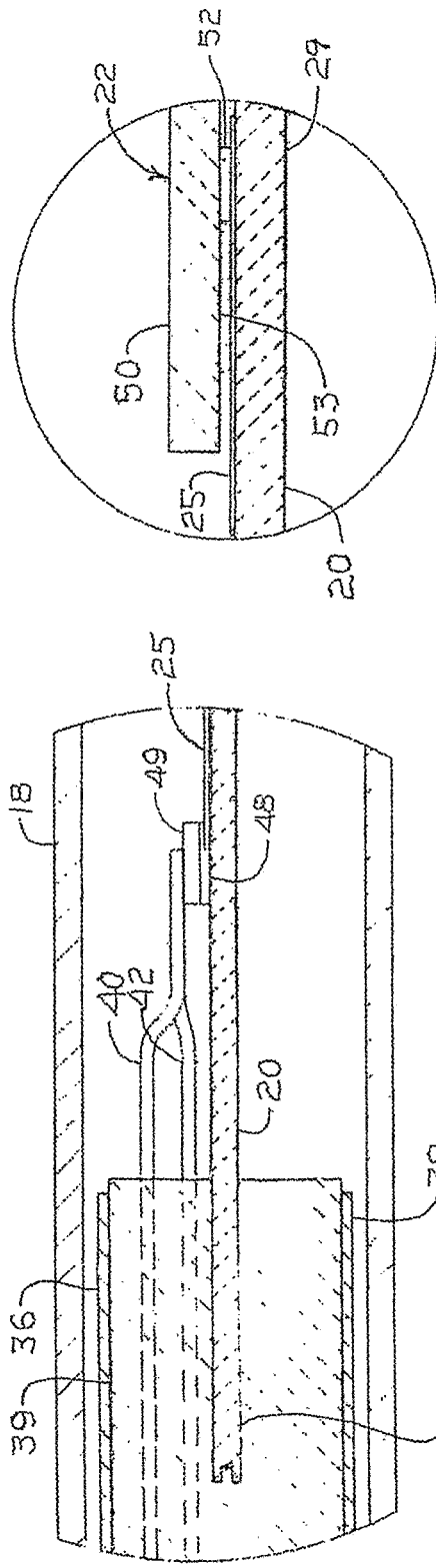

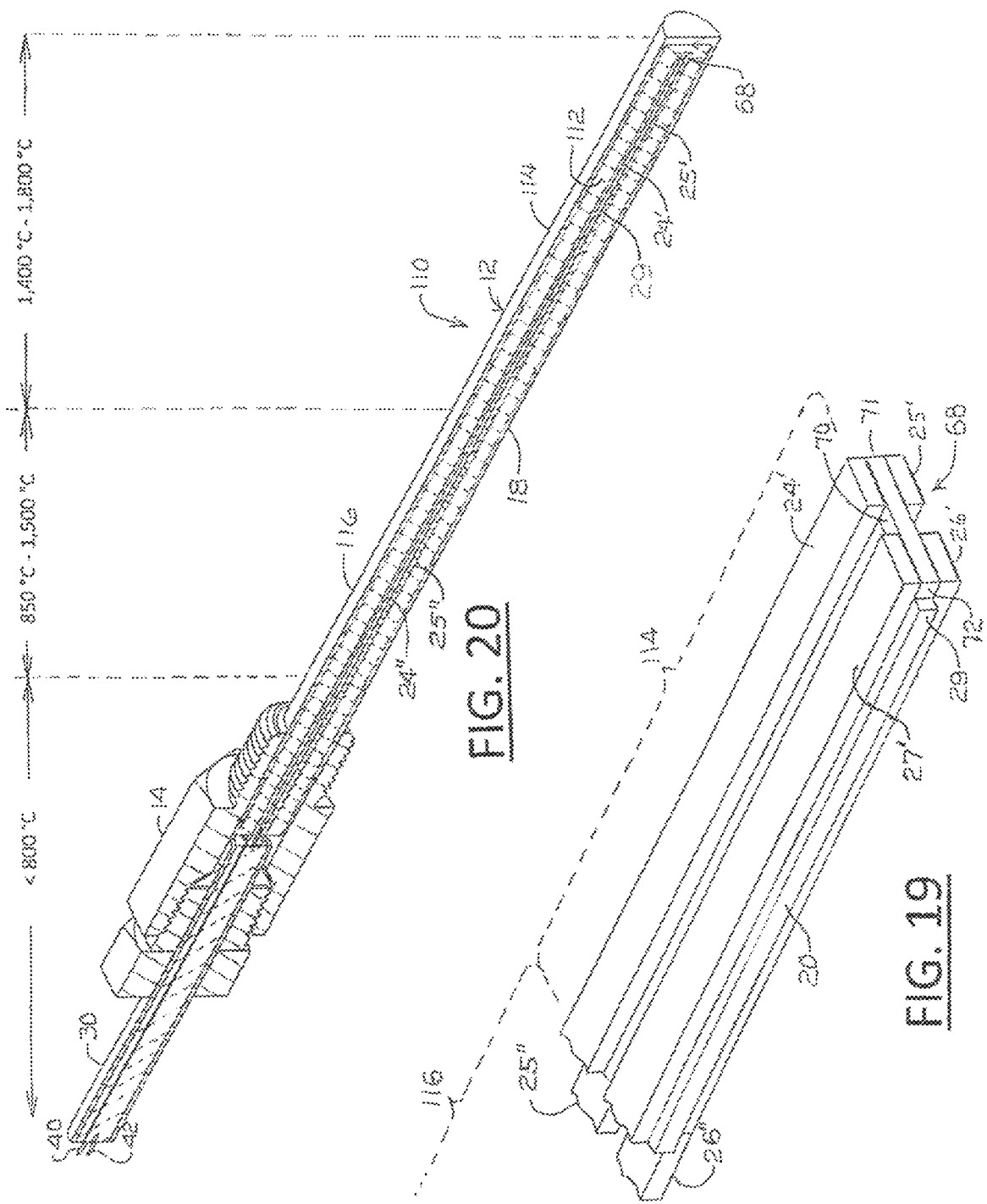

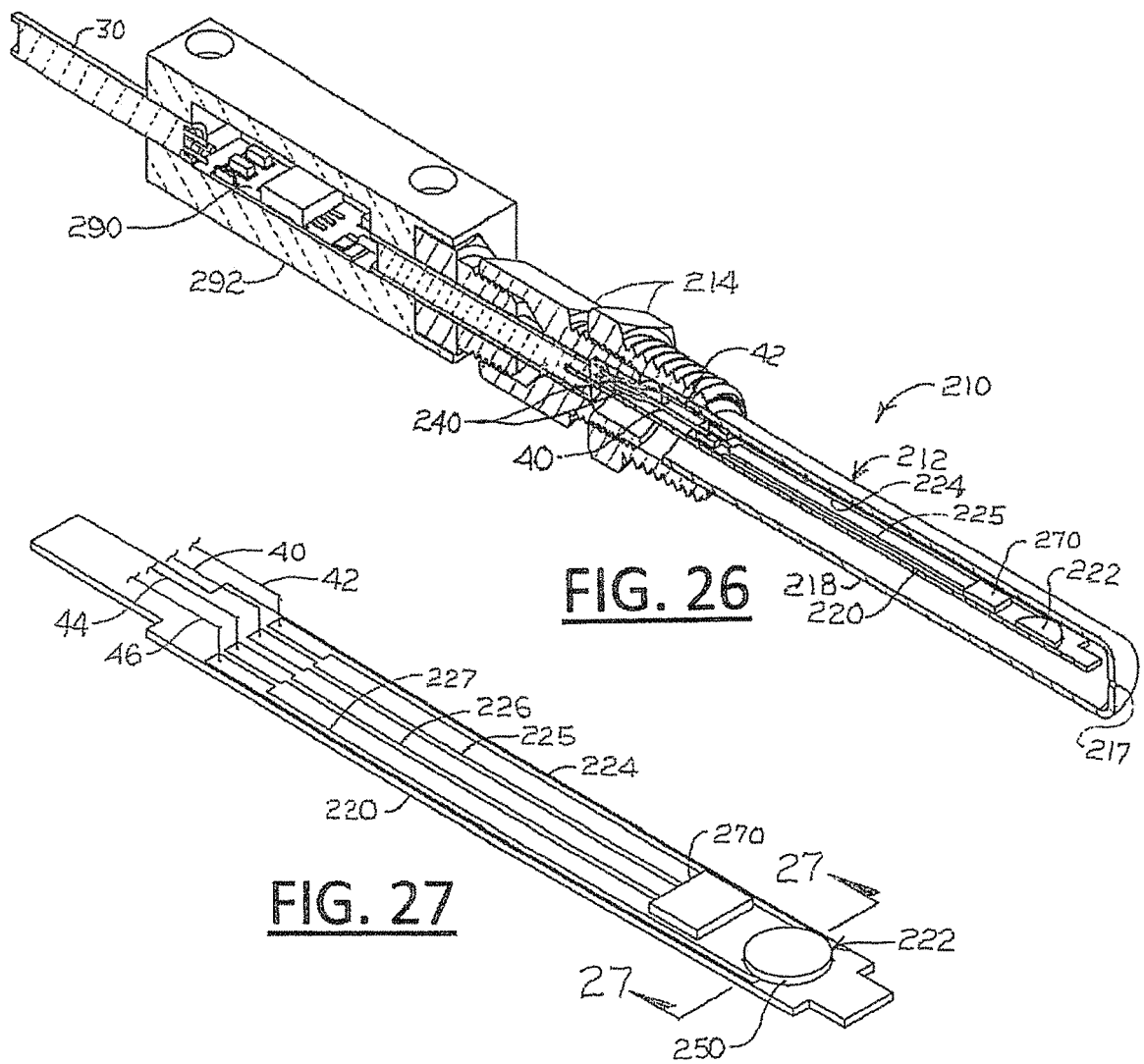
FIG. 26
FIG. 27
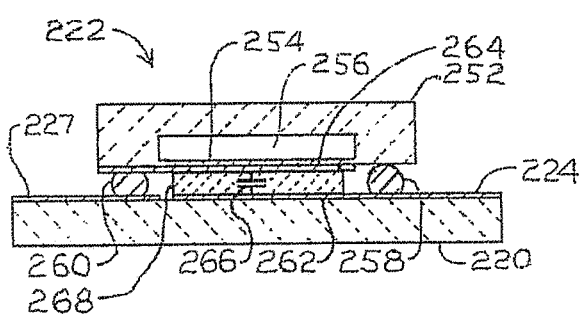
FIG. 28
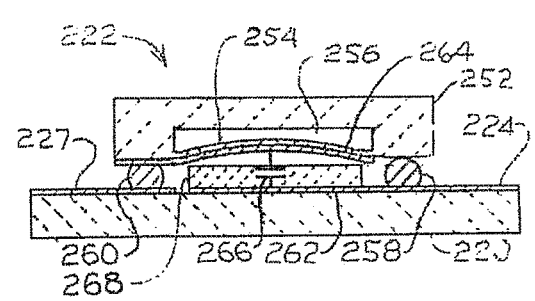
FIG. 29

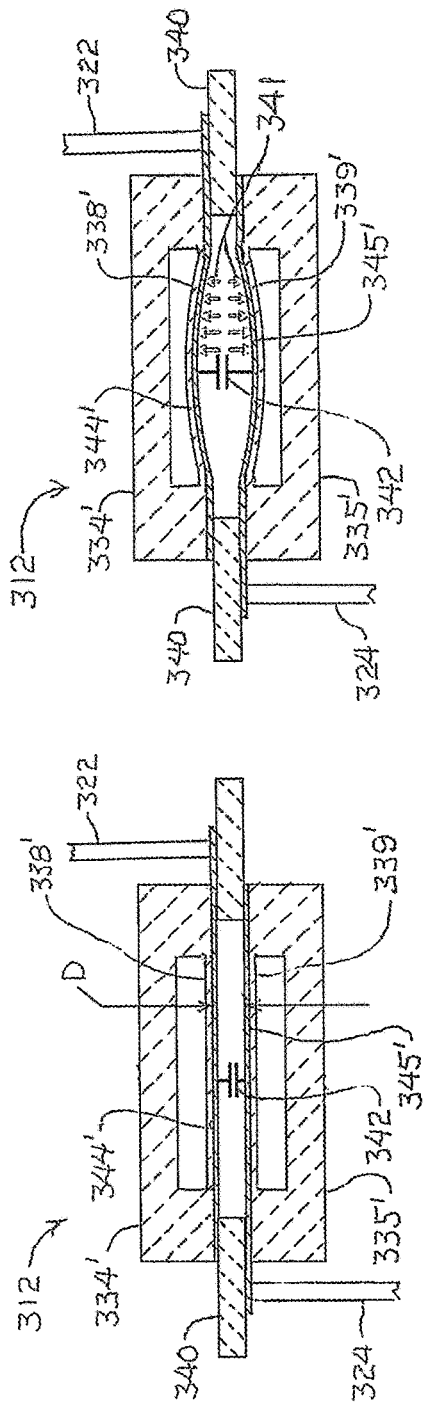
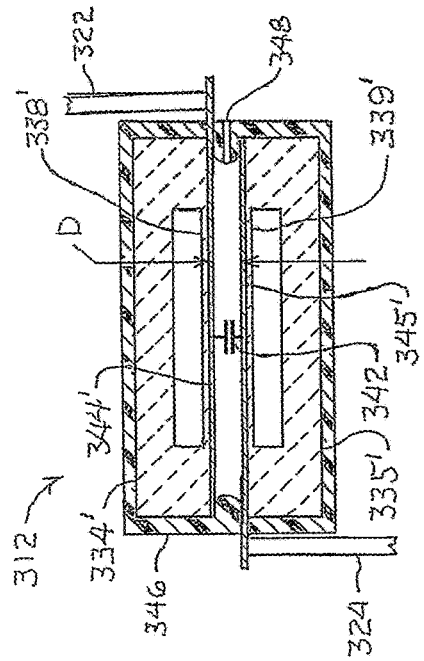
FIG. 35
FIG. 36
FIG. 37

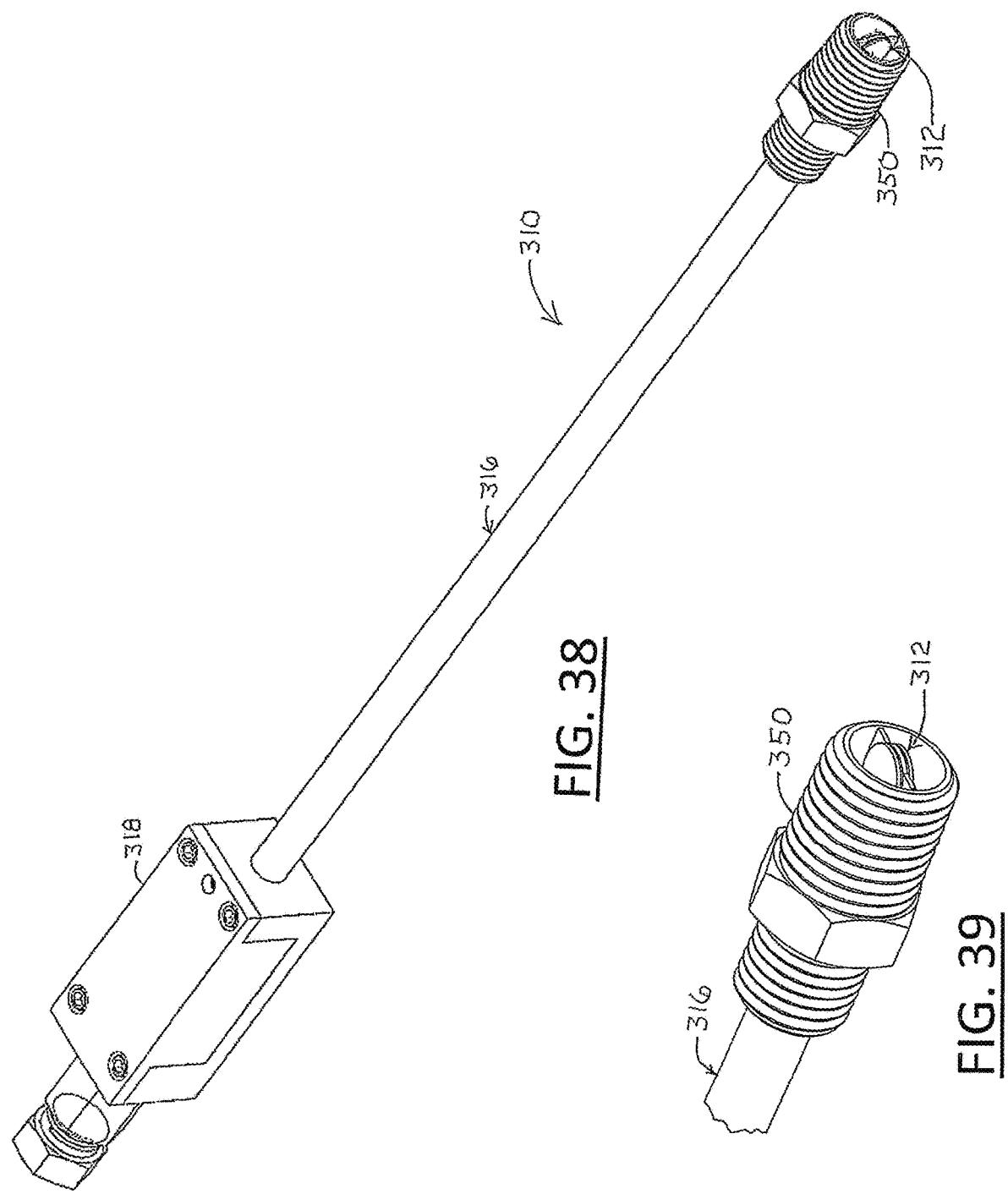

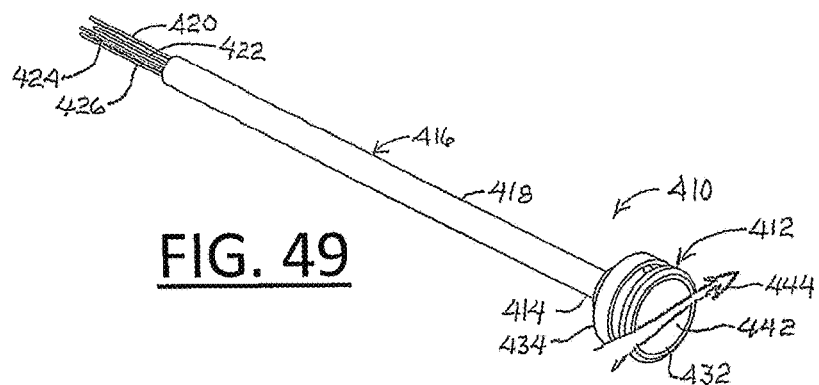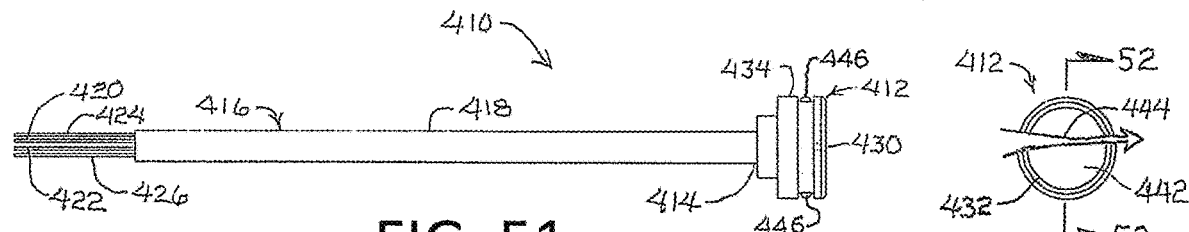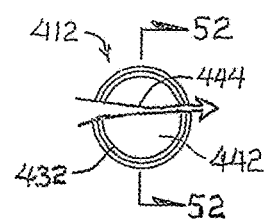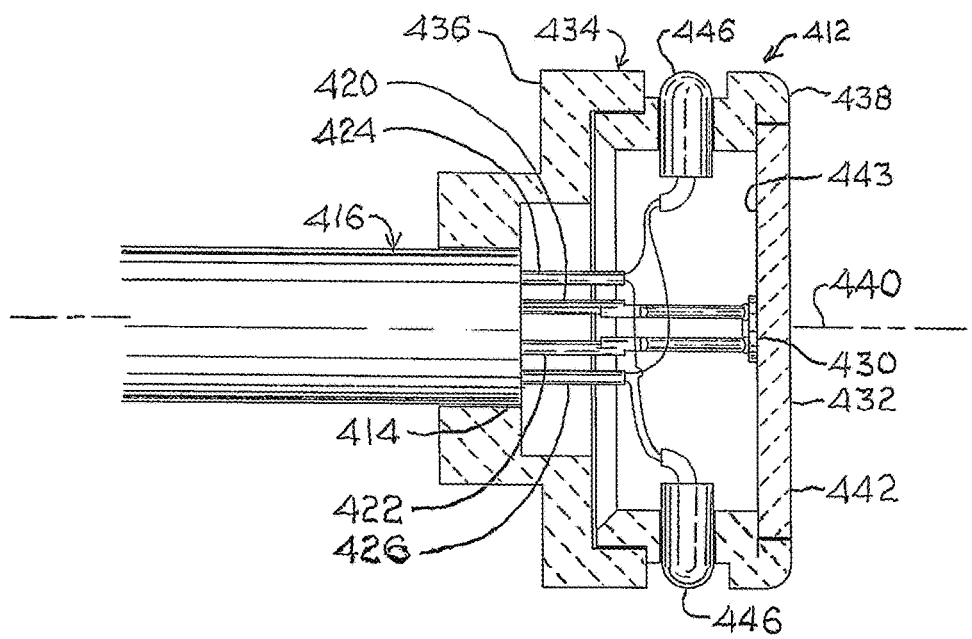

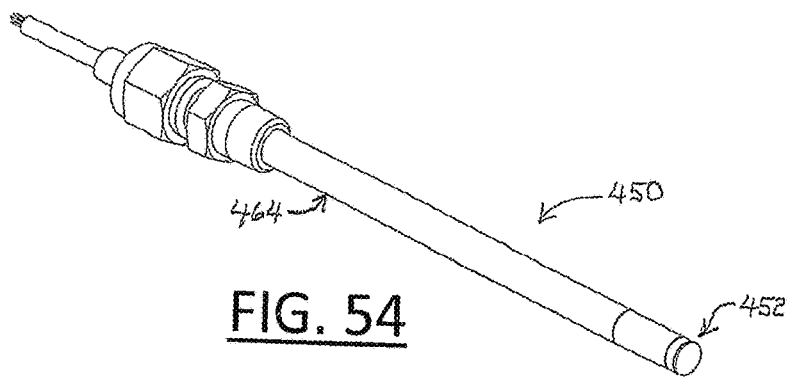
FIG. 54
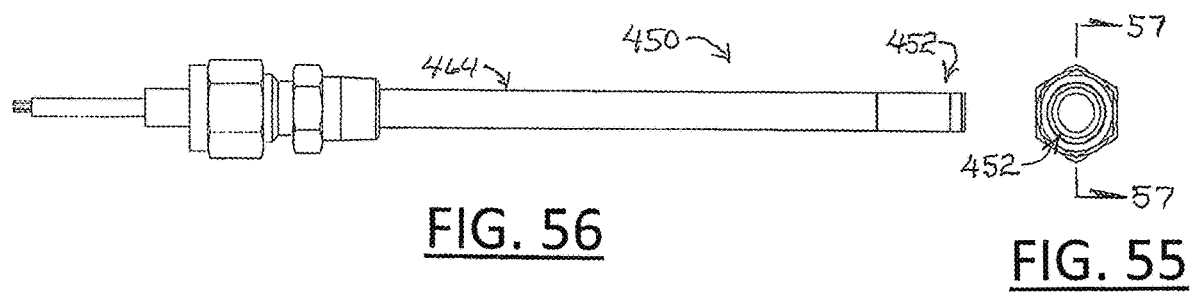
FIG. 56
FIG. 55
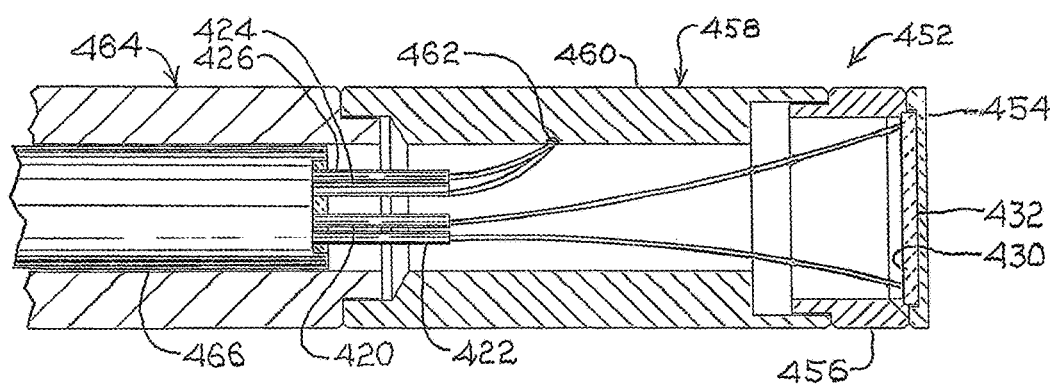
FIG. 57

COMPACT PRESSURE AND FLOW SENSORS FOR VERY HIGH TEMPERATURE AND CORROSIVE FLUIDS

BACKGROUND

Technical Field of the Invention

The present invention is related to sensors, and more particularly to sensors for detecting and measuring properties, such as temperature, pressure, flow rate, fluid level, and other properties in very high temperatures and other harsh operating conditions.

State of the Prior Art

Very high temperatures, for example, as high as 1,800° C., occur in some propulsion and power generation systems, for example, gas turbines, jet engines, coal gasifiers, concentrating solar power (CSP) heat transfer fluids (HTFs), and nuclear systems. Such very high temperatures, sometimes accompanied by corrosive, oxidizing, or reducing fluids, neutron flux, or other harsh conditions, present special problems for measuring various operating properties that are important for monitoring, control, and analyses of such propulsion and power generation systems, such as temperature, pressure, fluid flow, or fluid levels. Existing sensors for measuring such properties are not able to operate reliably for long periods of time at such very high temperatures and harsh conditions, which are detrimental to structural and electronics materials commonly used in such existing transducers and gauges.

The foregoing examples of the related art and limitations related therewith are intended to be illustrative and not exclusive. Other limitations of the related art and other examples of related art will become apparent to those of skill in the art upon a reading of the specification and a study of the drawings.

SUMMARY

The following embodiments and aspects thereof are described and illustrated in conjunction with systems, tools, and methods which are meant to be examples and illustrative, not limiting in scope. In various embodiments and implementations, one or more problems have been reduced or eliminated, while other embodiments are directed to other improvements and benefits.

A sensor device for detecting a property of a system, for example, temperature, pressure, fluid flow rate, or fluid level in very high temperature fluids comprises an electrically non-conductive ceramic core, a plurality of electrically conductive ceramic or metal electrical conductors on the core, and a transducer positioned on the core in electrical connection with the plurality of electrically conductive ceramic or metal electrical conductors. Some embodiments of the transducer also comprise electrically conductive ceramic elements in which electrical resistance varies as a function of temperature. In some embodiments of the sensor device, the ceramic electrical conductors and the transducers can withstand temperatures as high as 1,800° C.

An embodiment of the sensor device includes a capacitive pressure sensing transducer comprising a ceramic housing and a ceramic membrane that together enclose and hermetically seal a space, wherein the membrane is positioned a spaced distance apart from a first electrode and is resiliently deformable toward and away from the first electrode in response to pressure changes outside of the enclosed and hermetically sealed space. A second electrode on the membrane is movable with the membrane toward and away from the first electrode in a manner that forms a variable capacitor. The first electrode is in electrical connection with an electrical conductor on a ceramic core, and the second electrode is in electrical connection with another electrical conductor on the core. In some embodiments, the ceramic core, the ceramic housing, and the electrical conductors are made of materials that can withstand temperatures as high as 1,800° C.

An embodiment of a sensor device for sensing pressure of a very high temperature fluid comprises a transducer comprising a first pressure sensitive element and a second pressure sensitive element, wherein the first pressure sensitive element comprises a first housing that encloses and hermetically seals a first space, one side of the first housing including a resiliently deformable and electrically conductive first membrane, and wherein the first pressure sensitive element and the second pressure sensitive element are positioned adjacent to each other with the first membrane and the second membrane positioned in juxtaposed relation to each other a spaced distance apart from each other so as to form a capacitor. In one implementation, the first housing, including the first membrane, comprises an electrically conductive metal or metal alloy that can withstand very high temperatures, and the second housing, including the second membrane, comprises an electrically conductive metal or metal alloy that can withstand very high temperatures. In another implementation, the first housing comprises a ceramic material that can withstand very high temperatures and the first membrane comprises an electrically conductive metal or metal alloy that can withstand very high temperatures. Also, the second housing comprises a ceramic material that can withstand very high temperatures, and the second membrane comprises an electrically conductive metal or metal alloy that can withstand very high temperatures. The first membrane comprises a ceramic material that can withstand very high temperatures and an electrically conductive metal or metal alloy plate or coating, which can also withstand very high temperatures, formed on or attached to an external surface of the first membrane, and wherein the second membrane comprises a ceramic material that can withstand high temperatures or very high temperatures and an electrically conductive metal or metal alloy plate or coating, which can also withstand very high temperatures, formed on or attached to an external surface of the second membrane. A spacer can be positioned between respective peripheral, interfacing surfaces of the first and second housings. The spacer can comprise any non-conductive material that can withstand the high temperatures or very high temperatures. Several examples of such spacer materials may include ceramics and single crystal materials (e.g., quartz or sapphire), amorphous materials, fused crystalline materials (e.g., fused silica, fused sapphire, etc.). A putty or potting material can also be used as the spacer.

Another capacitive pressure sensor embodiment comprises a housing that encloses and hermetically seals a space, a side of the housing comprising a resiliently deformable or flexible membrane that deforms or flexes in response to pressure changes outside of the housing in a pressure range to be measured or monitored, wherein the housing and the membrane comprise a material that is corrosion resistant, a capacitor formed by a first electrode and a second electrode positioned inside the enclosed space and held apart from each other by one or more non-electrically conductive stand-off supports, the first electrode being resiliently deformable or flexible toward or away from the second electrode, and a pusher in the enclosed space that extends from the membrane toward the first electrode. In one such embodiment, the pusher extends all the way from the membrane to the first electrode, and in another such embodiment, the pusher does not extend all the way from the membrane to the first electrode.

A method of measuring pressure of a very high temperature fluid comprises placing a transducer in the fluid, wherein the transducer comprises: (i) a first pressure sensitive element, wherein the first pressure sensitive element comprises a first housing that encloses and hermetically seals a first space, and wherein one side of the first housing includes a resiliently deformable and electrically conductive first membrane; and (ii) a second pressure sensitive element disposed adjacent to the first pressure sensitive element, wherein the second pressure sensitive element comprises a second housing that encloses and hermetically seals a second space, and wherein one side of the second housing includes a resiliently deformable and electrically conductive second membrane, and further, wherein the second pressure sensitive element is positioned and oriented such that the second membrane is juxtaposed to the first membrane with a distance between the first membrane and the second membrane, applying a voltage across the first membrane and the second membrane, measuring capacitance between the first membrane and the second membrane, and determining the pressure of the fluid by comparing the capacitance to a predetermined correlation of capacitance measurements to pressures.

A flow meter embodiment for sensing flow of a high temperature fluid comprises a transducer comprising a housing that encloses a space, said housing comprising a corrosion resistant material that can withstand high temperatures of the fluid for which flow is sensed, including one side of the housing comprising a ceramic substrate with a surface outside of the housing and another surface that is inside the housing, and a plate or cladding comprising a corrosion resistant material that can withstand the high temperatures of the fluid for which flow is to be sensed with the flow meter sensor; and a sensor element mounted on the surface of the ceramic substrate that is inside the housing, said sensor element comprising an electrically resistive material, the resistivity of which varies as a function of temperature, and which can withstand the high temperatures of the fluid for which flow is sensed. The corrosion resistant material can comprise a metal or metal alloy that can withstand the high temperatures of the fluid for which flow is to be sensed with the flow meter sensor.

A flow meter sensor embodiment for detection mass flow rate and flow direction of a fluid flow comprises an elongate tubular heater extending coaxially through an elongate, cylindrical core material that has a longitudinal axis and a peripheral surface; and at least three elongate temperature sensors extending through the core material parallel to the longitudinal axis and spaced apart angularly in relation to each other about the longitudinal axis and radially outward from the longitudinal axis toward, but not all the way to, the peripheral surface of the core material. The core material is a modest, but overly good, heat conductor material, as explained in more detail below. The core material is a material that can withstand very high temperatures. One implementation can include an elongate, protective sheath around the peripheral surface of the core material. The protective sheath can comprise a material that can withstand very corrosive fluids.

A method of detecting flow direction of a flowing fluid comprises positioning an elongate core in the flowing fluid, the elongate core having a peripheral surface and an elongate tubular heater disposed along a longitudinal axis of the elongate core and at least three elongate temperature sensors disposed through the core parallel to the longitudinal axis and spaced angularly in relation to each other about the longitudinal axis and radially outward from the longitudinal axis toward the peripheral surface of the core material; measuring temperatures at each of the temperature sensors; and determining leeward direction as higher temperature readings and windward side as lower temperature readings. Mass flow rate can be determined as a function of a difference between temperature of the heat tube and the lowest temperature reading from the temperature sensors.

In addition to the example aspects, embodiments, and implementations described above, further aspects, embodiments, and implementations will become apparent to persons skilled in the art after becoming familiar with the drawings and study of the following descriptions.

BRIEF DESCRIPTION OF THE DRAWINGS

The accompanying drawings, which are incorporated herein and form a part of the specification, illustrate some, but not the only or exclusive, example embodiments and/or features. It is intended that the embodiments and figures disclosed herein are to be considered illustrative rather than limiting. In the drawings:

FIG. 14 is a cross-section view of the example heat resistant sensor device taken along section plane 14-14 in FIG. 2;

FIG. 14A is an enlarged portion 14A of FIG. 14;

FIG. 14B is an enlarged portion 14B of FIG. 14;

FIG. 19 is an isometric view of another alternate embodiment core and temperature transducer;

FIG. 20 is an isometric view of an alternate temperature sensor device example with the alternate embodiment core in FIG. 19 encased in a potting material in the shield around the core;

FIG. 26 is an isometric cross-section view of an alternate embodiment heat resistant sensor device comprising a capacitive pressure transducer;

FIG. 27 is an isometric view of the capacitive pressure transducer on the core of the example heat resistant sensor device in FIG. 26;

FIG. 28 is an enlarged cross-section view of the capacitive pressure transducer in FIGS. 26 and 27 taken along the section plane 27-27 in FIG. 27;

FIG. 29 is an enlarged cross-section view of the capacitive pressure transducer similar to FIG. 28 but showing the membrane with one of the capacitor electrodes flexed due to pressure on the membrane;

FIG. 35 is a diagrammatic view of a ceramic version of the of the capacitive pressure transducer in FIGS. 30-33;

FIG. 36 is a diagrammatic view of the ceramic version of the capacitive pressure transducer exposed to increasing pressure;

FIG. 37 is a diagrammatic view of the ceramic version of the capacitive pressure transducer encapsulated in a potting or coating;

FIG. 38 is an isometric view of the capacitive pressure sensor in FIGS. 30-33 mounted in a fitting on a probe;

FIG. 39 is an enlarged isometric view of the capacitive pressure sensor of FIGS. 30-33 mounted in the fitting on the probe;

FIG. 49 is an isometric view of an example rotation-insensitive flow meter sensor;

FIG. 50 is a side elevation view of the example rotation-insensitive flow meter sensor of FIG. 49;

FIG. 51 is a front end elevation view of the example rotation-insensitive flow meter sensor of FIG. 49;

FIG. 52 is an enlarged cross-section view of the flow transducer of the example rotation-insensitive flow meter sensor of FIG. 49 taken along the cutting plane line 52-52 in FIG. 51;

FIG. 54 is an isometric view of an alternate example rotation-insensitive flow meter sensor;

FIG. 55 is a side elevation view of the example rotation-insensitive flow meter sensor of FIG. 54;

FIG. 56 is a front end elevation view of the example rotation-insensitive flow meter sensor of FIG. 54;

FIG. 57 is an enlarged cross section view of the flow transducer of the example rotation insensitive flow meter of FIG. 54 taken along the cutting plane line 57-57 in FIG. 56;

DETAILED DESCRIPTIONS OF EXAMPLE EMBODIMENTS

Figure 1:
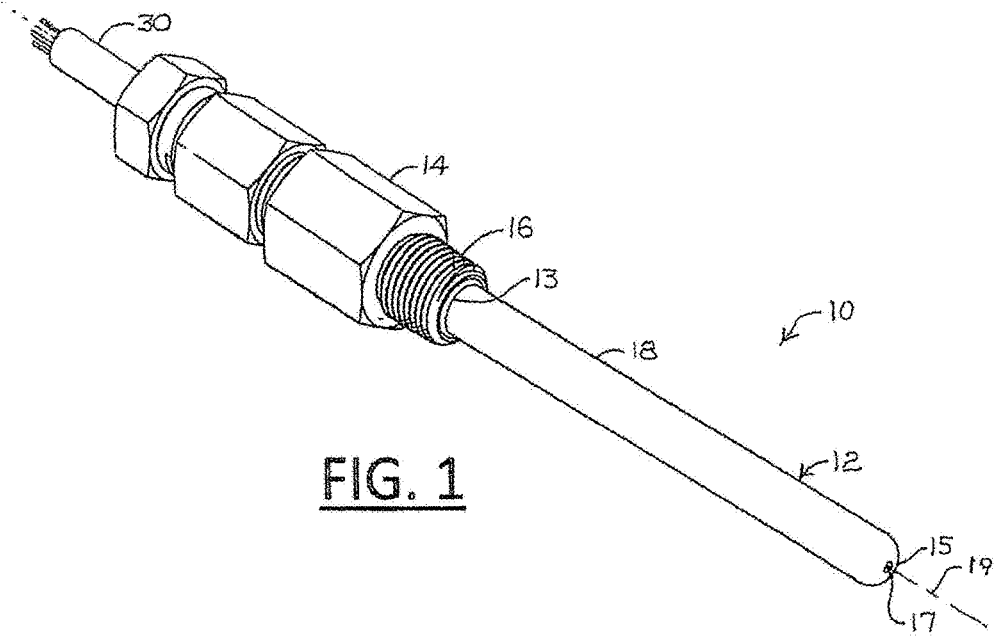
FIG. 1 is an isometric view of an example heat resistant sensor device that is capable of withstanding very high temperatures and configured for mounting in any of a variety of very high temperature chambers or other harsh environments.

An example heat resistant sensor device 10 illustrated in FIGS. 1-5 can be equipped with any of a variety of transducers for measuring any of a variety of properties and is constructed of materials and in a manner that can withstand very high temperatures, e.g., as high as 1,800° C., which are produced or encountered in some power systems, for example, gas turbines, jet engines, coal gasifiers, concentrating solar power (CSP) heat transfer fluids (HTFs), or nuclear systems. The heat resistant sensor device 10 can also withstand other harsh environments, including oxidizing atmospheres, reducing atmospheres, corrosive atmospheres, and neutron irradiation.

Referring now to FIGS. 1-5 for an overview of the example heat resistant sensor device 10 and to FIGS. 6-14B for more example details, the example heat resistant sensor device 10 comprises an elongate probe 12 extending along a longitudinal axis 19 from a proximal end 13 mounted in a fitting 14 to a distal end 15. The probe 12 is configured for extending into a chamber, pipe, or other environment (not shown) where a property of a fluid medium (not shown), e.g., temperature, pressure, flow rate, fluid level, etc., is to be sensed for measurement or other purposes. For example, the fitting 14 can be configured as a pipe adapter with an externally threaded section 16 to be screwed into an internally threaded hole or port in a chamber or pipe wall (not shown) so that the probe 12 extends into the chamber or pipe. Of course, other types of fittings, for example, welded, flanged, machined, or adhered fittings (not shown) instead of threaded fittings can be used. Some of the dimensions of components in actual implementations of the heat resistant sensor device 10 in the drawings are too thin to draw to scale, so some of the components of the example heat resistant sensor device 10 are not shown in exact proportion in relation to other components in the drawings, but persons skilled in the art can understand the basic concepts shown and described.

Figure 2:
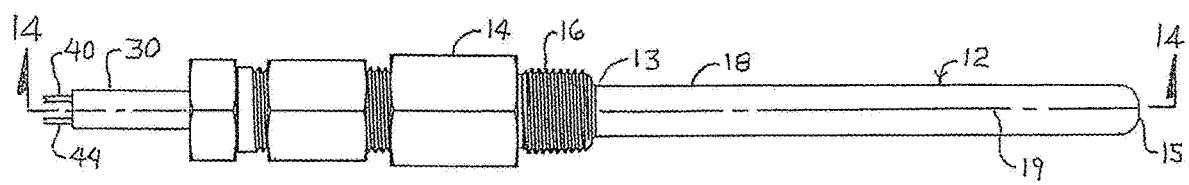
FIG. 2 is a top plan view of the example heat resistant sensor device in FIG. 1.
Figure 3:
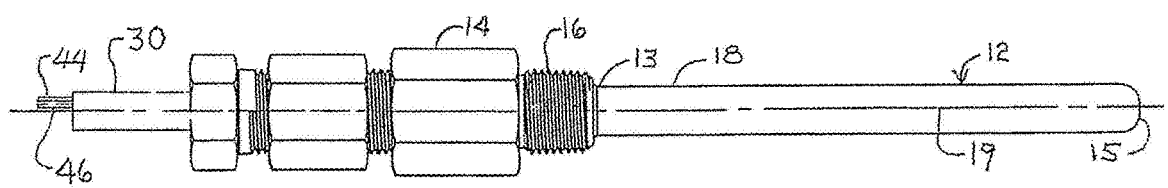
FIG. 3 is a side elevation view of the example heat resistant sensor device in FIG. 1.
Figure 4:
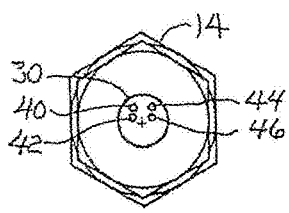
FIG. 4 is a rear elevation view of the example heat resistant sensor device in FIG. 1.

The probe 12 of the example heat resistant sensor device 10 comprises a non-electrically conductive ceramic core 20, which is best seen in FIGS. 6-8 and 11-14, along with a transducer 22, electrical conductors 24, 25, 26, 27, and electrical connections, which will be described in more detail below. In this example heat resistant sensor device 10, the transducer 22 is mounted on the core 20, and the electrical conductors 24, 25, 26, 27 are positioned on and extend longitudinally along the core 20 into electrical connection with the transducer 22, but other configurations can be used. Several examples of other configurations are described below. An optional shield 18, which is best seen in FIGS. 1-3, surrounds and protects the core 20, transducer 22, and electrical conductors 24, 25, 26, 27.

Figure 5:
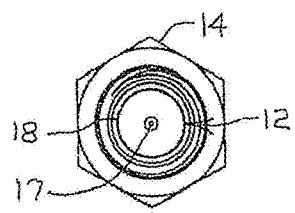
FIG. 5 is a front elevation view of example heat resistant sensor device in FIG. 1.
Figure 6:
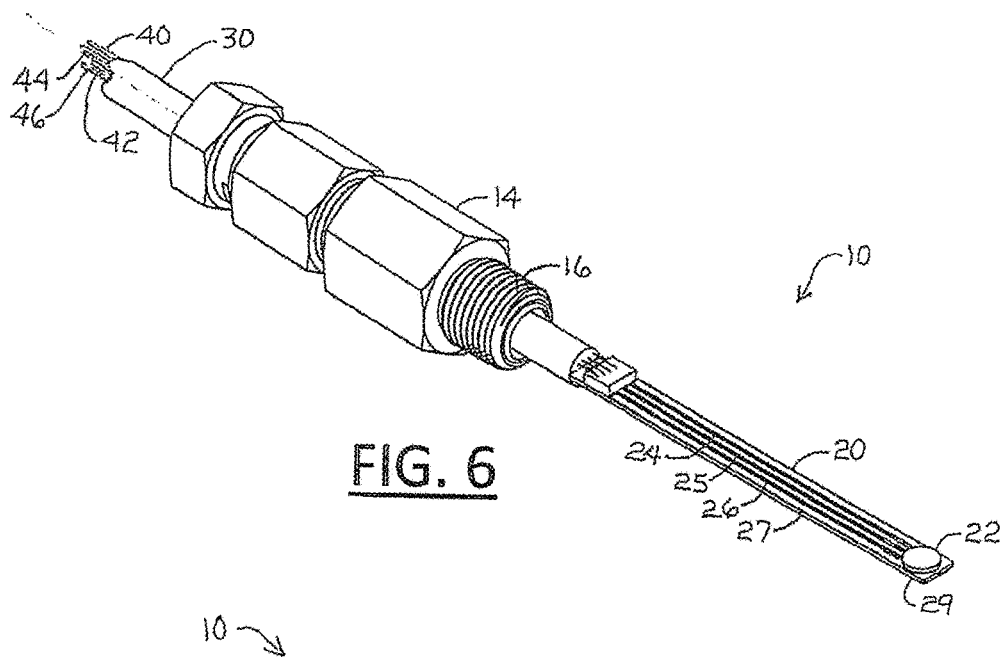
FIG. 6 is an isometric view of the example heat resistant sensor device similar to FIG. 1, but with the shield removed to reveal the sensor core, transducer, and connections.
Figure 7:
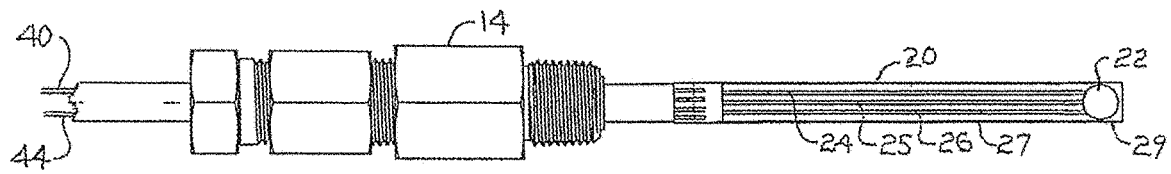
FIG. 7 is a top plan view of the example heat resistant sensor device similar to FIG. 2, but with the shield removed to reveal the sensor core, transducer, and connections.
Figure 8:
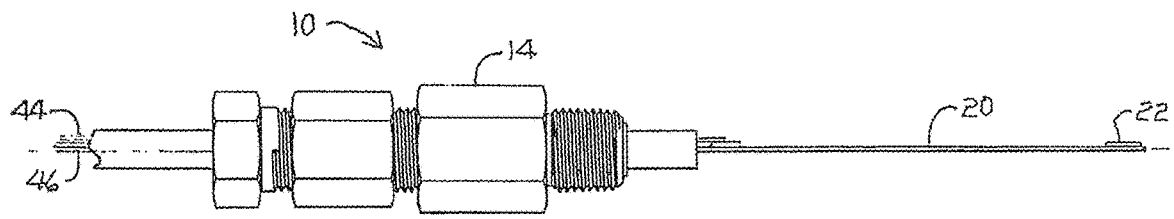
FIG. 8 is a front elevation view of the example heat resistant sensor device similar to FIG. 3, but with the shield removed to reveal the sensor core, transducer, and connections.
Figure 9:
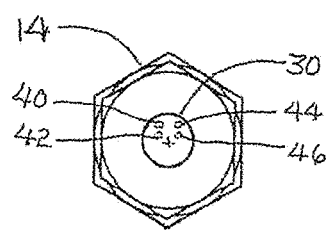
FIG. 9 is a rear end elevation view of the example heat resistant sensor device similar to FIG. 4, but with the shield removed.
Figure 10:
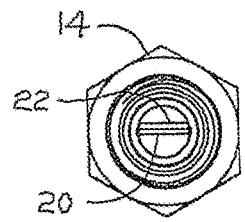
FIG. 10 is a front end elevation view of the example heat resistant sensor device similar to FIG. 5, but with the shield removed.
Figure 11:
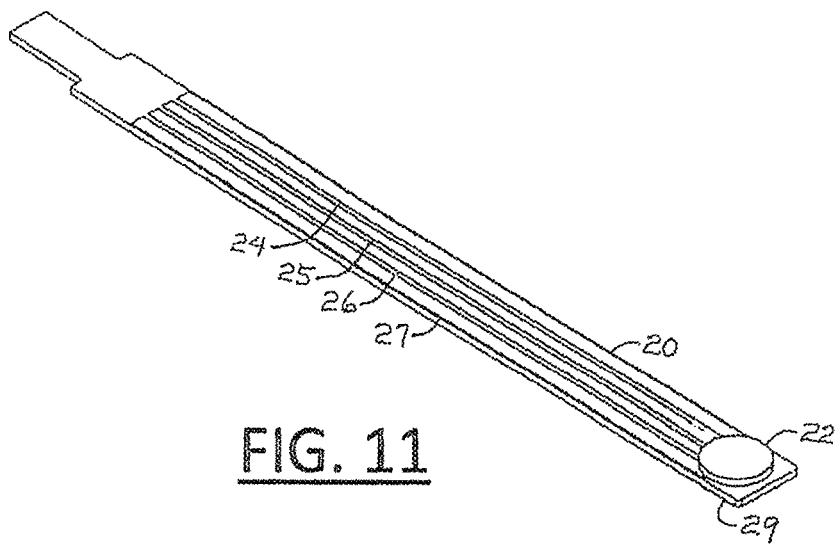
FIG. 11 is an isometric view of an example core of the example heat resistant sensor device in FIG. 1.
Figure 12:
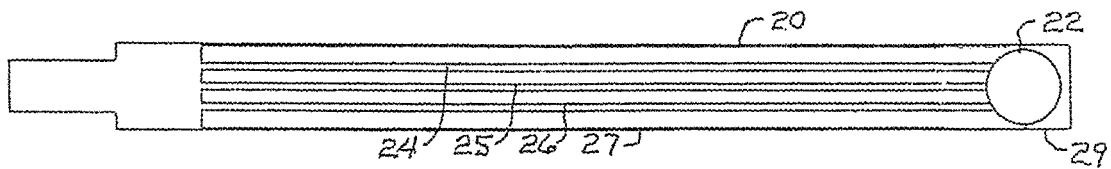
FIG. 12 is a top plan view of the example core in FIG. 11.
Figure 13:
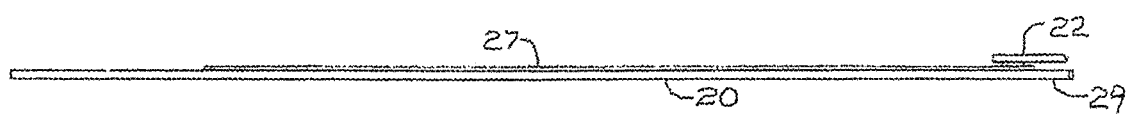
FIG. 13 is a side elevation view of the example core in FIG. 11

The shield 18 can be pressure sealed to the fitting 14 to isolate the interior of the shield 18 from the pressure outside the shield 18 if desired, or the interior of the shield 18 can be connected in fluid flow communication with the environment outside the shield 18, for example, by providing a hole 17 through the distal end of the shield 18 (see FIGS. 1, 5, and 14). Four electrical conductors 24, 25, 26, 27 are illustrated on the core 20 in FIGS. 6-8 and 14, but any number of electrical conductors can be provided to accommodate whatever kind of transducer 22 that may be used for a particular purpose. The ceramic core 20 is electrically non-conductive and provides a substrate structure for supporting the electrical conductors 24, 25, 26, 27 and the transducer 22. The electrical conductors 24, 25, 26, 27 can be deposited on the core 20 in thicknesses in a range of 1,000 microns to five angstroms. Any appropriate thin film process (for example, chemical vapor deposition, physical vapor deposition, sputtering, atomic layer deposition, molecular beam epitaxy, evaporation, ion implantation, chemical films synthesis, chemical solution deposition, spin coating, dip coating, cathodic arc deposition, and other known thin film deposition process) or appropriate thick film process (for example, screen printing of conductive ink, stenciling, electroplating, and the like), which are well-known to persons skilled in the art, can be used to deposit the electrical conductors 24, 25, 26, 27. Distinct wires (not shown) could also be used in some implementations.

Because of the very high temperature environments and applications for which the example heat resistant sensor device 10 is intended, the core 20 and electrical conductors 24, 25, 26, 27 are made of materials that can withstand such high temperatures, e.g., 1,000° C., 1,400° C., or even 1,800° C. Accordingly, the ceramic core 20 can be fabricated using traditional High Temperature Cofired Ceramic technology (HTCC) or Low Temperature Coined Ceramic (LTCC) technology comprising, for example, but not for limitation, alumina (high and low purity), zirconia (yttria doped and non-doped), beryllium oxide (beryllia, BeO), hafnium oxide (haft is magnesium oxide, silicon carbide, silicon nitride, sapphire, amorphous silica, or quartz. For example, silicon nitride or LTCC glass ceramics, glass ceramic composite, or glass bonded ceramics can be used for a core 20 that must withstand temperatures up to 1,000° C.; alumina, aluminum nitride, silicon carbide or magnesium oxide can be used for a core that must withstand temperatures up to 1,400° C.; and sapphire, hafnium, or beryllium oxide can be used for a core 20 that must withstand temperatures up to 1,800° C. While not shown, the ceramic core 20 could include a laminated or other composite structure comprising a high temperature refractory or Noble metal along with the ceramic as long as electrical insulation for the electrical conductors 24, 25, 26, 27 is maintained.

The electrical conductors 24, 25, 26, 27 can be metallic conductors or conductive ceramic conductors. Appropriate materials for electrical conductors 24, 25, 26, 27 in probes 12 that can withstand temperatures as high a 1,800° C. may include, for example, all platinum group metals, alloys comprising platinum (Pt) or rhodium (Rh), all refractory metals, e.g., niobium (Nb) or tungsten (W), alloys comprising refractory metals, e.g., molybdenum silicide ($MoSi_2$), and very high temperature (VHT) polymer derived ceramics, e.g., SiBCN or SiAlCN. Other electrically conductive ceramics for the electrical conductors 24, 25, 26, 27 in probes 12 that can withstand temperatures as high as 1,800° C. may include lanthanum-based ceramics, titanium diboride ($TiB_2$), titanium disilicide ($TiSi_2$), refractory carbides or borides, indium tin oxide (ITO), conductive zirconia, or doped or undoped silicon carbonitride (SiCN). Gold (Au), silver (Ag), or palladium (Pd) can be used for lower temperature applications, e.g., up to 1,000° C. The electrical conductors 24, 25, 26, 27 can be applied on the ceramic core 20 in thick films or thin films with any known suitable technique, for example, screen printing, stenciling and sintering thick film inks, chemical vapor deposition, physical vapor deposition, sputtering, organometallic deposition, or thermal decomposition of polymers. The fittings 14 and shield 18 are also made of high temperature metals or alloys, including, for example, stainless steel or nickel alloys such as Hastalloy or Inconel, although the shield 18 may also be ceramic or sapphire in some embodiments.

As best seen in FIGS. 14, 14A, and 14B, the probe 12 is mounted in the fitting 14. The proximal end 28 of the core 20 is connected mechanically to the fitting 14. The electrical conductors 24, 25, 26, 27 on the core 12 are connected electrically to a cable 30, which extends into an opposite end of the fitting 14 from the probe 12 to carry electrical signals from the transducer 22 to signal processing circuitry (not shown), which can be located remote from the probe 12. Inside the fitting 14, an end 32 of the cable 30 extends into a proximal end 34 of a thin cylindrical sheath 36, and the proximal end 28 of the core 20 extends into the distal end 38 of the thin cylindrical sheath 36. The cable 30 can be a mineral-insulated cable that can withstand very high temperatures, A plurality of electrically conductive wires, for example, four wires 40, 42, 44, 46, of the cable 30 (two of which are visible in FIGS. 14 and 14A) extend through the thin cylindrical sheath 36 for connection to electrical conductors 24, 25, 26, 27 on the core 20 of the probe 12. Some electrical conductor materials, for example, thick film inks used in High Temperature Cofired Ceramic (HTCC) processing, do not have a strong adherence to the core 20, so direct connection of the cable wires 40, 42, 44, 46 to the respective electrical conductors 24, 25, 26, 27 on the core 20 may not be sufficiently secure. The example electrical connection of the cable wire 40 to the electrical conductor 25 on the core 20 shown in FIG. 14A comprises a braze or weld interconnect 48 of a metal tab 49, wherein the braze interconnect contacts and adheres to both the electrical conductor 25 and core 20, which makes a strong mechanical bond of the metal tab 49 to both the core 20 and the electrical conductor 25. The cable wire 40 is brazed 48 to the metal tab 49 for a strong mechanical and electrical connection of the cable wire 40 to the electrical conductor 25. All of the materials used in the connection components are compatible with the very high temperature range described above. The remaining cable wires 42, 44, 46 can be connected to the respective remaining electrical conductors 24, 26, 27 in the same manner as this connection of cable wire 40 to the electrical conductor 25.

With all of the cable wires 40, 42, 44, 46 connected to respective electrical conductors 24, 25, 26, 27, the sheath 36 can, but does not have to, be filled with an electrically non-conductive ceramic cement or potting compound 39 and allowed to solidify around the proximal end 28 of the ceramic core 20 and around the cable wires 40, 42, 44, 46 to insulate the cable wires 40, 42, 44, 46 electrically and to form a strong mechanical connection between the cable 30 and the proximal end 28 of the core 20. Ceramic cements and potting compounds comprising alumina, zirconia, silica, hafnia, magnesia, beryllia, and others are available commercially. The potting material 39 also pressure seals the connection of the core 20 and electrical conductors 24, 25, 26, 27 to the cable 30 to provide a pressure sealed feed-through of the cable wires 40, 42, 44, 46 in the fitting 14 to enable the heat resistant sensor device 10 to be used with the probe 12 in chambers, pipes, or other spaces in which the pressure is different than the ambient pressure outside such chambers, pipes, or other spaces. A machined or extruded solid ceramic plug comprising any of those ceramic materials could be used instead of the ceramic cement or potting material. All of the materials used in the connection are high temperature compatible.

Figure 15:
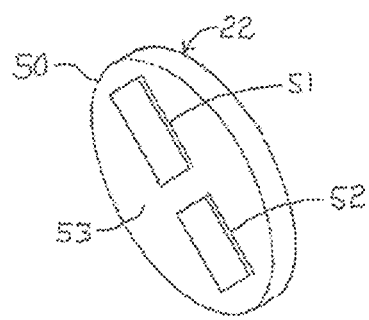
FIG. 15 is an enlarged perspective view of the bottom of an example conductive ceramic temperature transducer showing example contacts for electrical connections to the electrical conductors of the example heat resistant sensor device in FIG. 1.

As explained above, the transducer 22 in the example heat resistant sensor device 10 is shown in FIGS. 6-8, 14, and 14B mounted on the distal end 29 of the core 30 and can be any of a variety of transducers that can sense any of a variety of conditions, for example, temperature, pressure, or other conditions. To measure temperatures in the very high temperature range of, for example, 800° C. to 1,800° C., the transducer 22 can be, for example, a temperature transducer 50 as shown in FIGS. 14B and 15 based on the temperature dependent electrical resistance of an electrically conductive ceramic, such as SiBCN, SiAlCN, or $MoSi_2$. Other ceramic materials with temperature dependent resistivities can also be used for the temperature sensing element 50, for example, silicon carbide, boron carbide, hafnium carbide, zirconia, lanthanum-based ceramics, and others. Graphite and indium tin oxide (ITO) also have resistances that vary as a function of temperature and may be used as the temperature transducer 22 for some applications, for example, directly measuring temperature or as part of thermal based pressure, vacuum, or flow sensing strategies where the temperature of the sensing element varies in response to the target measurand. Accordingly, as shown in FIG. 15, an example temperature transducer 50 made of such a ceramic in which the electrical resistance varies as a function of temperature is provided with a plurality of electrically conductive contacts, e.g., two contacts 51, 52, placed at respective positions apart from each other on the bottom surface 53 of the temperature transducer 50 that will align with and contact appropriate electrical conductors 24, 25, 26, 27 on the core 20 when the temperature transducer 50 is placed on core 20 as shown in FIG. 14B and as explained in more detail below. The electrical resistance of the ceramic material of the temperature transducer 50 between the respective contacts 51, 52 varies as a function of temperature, so a voltage applied across the two contacts 51, 52 will result in temperature dependent variation in current according to Ohm's law, which can be detected by electronic circuitry remote from the heat resistant sensor device 10. Conversely, a constant current applied between the two contacts 51, 52 will result in temperature dependent variation in voltage according to Ohm's law, which can be detected by electronic circuitry remote from the heat resistant sensor device 10.

Figure 16:
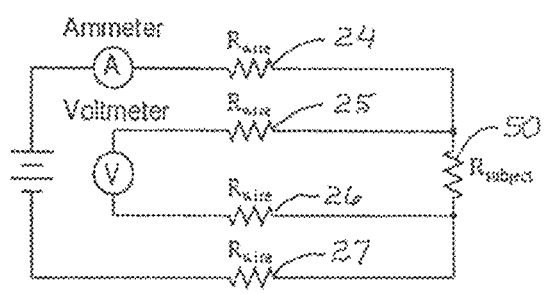
FIG. 16 is a schematic diagram of a conventional 4-wire Kelvin sensing circuit that can be used for the transducers.

A conventional 4-wire Kelvin sensing circuit as illustrated in FIG. 16 can be used for driving and obtaining signals from the temperature transducer 50 for determining resistance of the ceramic material of the temperature transducer 50, which is indicative of temperature. Two leads are used to drive a known current across the subject resistor $R_{subject}$ (e.g., the temperature transducer 50 in FIGS. 14A and 14B), which results in a voltage potential across the subject resistor $R_{subject}$. A second pair of leads is used to measure that generated voltage potential across the subject resistor $R_{subject}$. Using Ohm's law, i.e., resistance equals voltage divided by current (R=V/I), resistance of the subject resistor $R_{subject}$ (e.g., temperature transducer 50) can be determined by dividing the voltage measurement from the voltmeter by the amperage (current).

An example implementation of such a 4-wire Kelvin sensing circuit to the temperature transducer 50 and probe 12 of the example heat resistant sensor device 10 can be seen with reference to FIGS. 11, 12, 14B, 15, and 16. The example temperature transducer 50 shown in FIG. 15 has two electrically conductive contacts 51, 52 on its bottom surface 53 positioned so that, when the temperature transducer 50 is positioned on the core 20, the contact 51 on the bottom surface 53 of the temperature transducer 50 is connected electrically to both the electric conductor 24 and the electric conductor 25. Similarly, the contact 52 on the bottom surface 53 of the temperature transducer 50 is connected electrically to both the electric conductor 26 and the electric conductor 27. Accordingly, the two outside electrical conductors 24, 27 are used to drive a known current across the temperature transducer 50 between the contacts 51, 52, which results in a voltage potential across that ceramic material. In one embodiment, the temperature transducer 50 may be an electrically conductive ceramic material, but other materials with temperature dependent resistivities that are capable of withstanding the very temperatures described above could also be used. The two inner electrical conductors 25, 26 are used to measure that generated voltage potential across the material of the temperature transducer 50 between the contacts 51, 52. Alternatively, the inner conductors 25, 26 could be used to drive the known current across the transducer 50 and the outer conductors 24, 27 could be used for detecting the voltage. The volt meter, ammeter, and other circuit components can be positioned remote from the example heat resistant sensor device 10, connected to the temperature transducer 50 by the cable 30 (described above). Using Ohm's law, i.e., resistance equals voltage divided by current (R=V/I), the resistance of the temperature transducer 50 can be determined, and the resistance can then be correlated empirically to temperature.

The temperature transducer 50 can be fastened to the distal end 29 of the core 20 with an epoxy adhesive or any other convenient instrumentality that can withstand the very high temperature range, e.g., 650° C. to 1,800° C. Of course, other electrical connections can be used to connect the temperature transducer 50 to the electrical conductors 24, 25, 26, 27 on the ceramic core 20.

Figure 17:
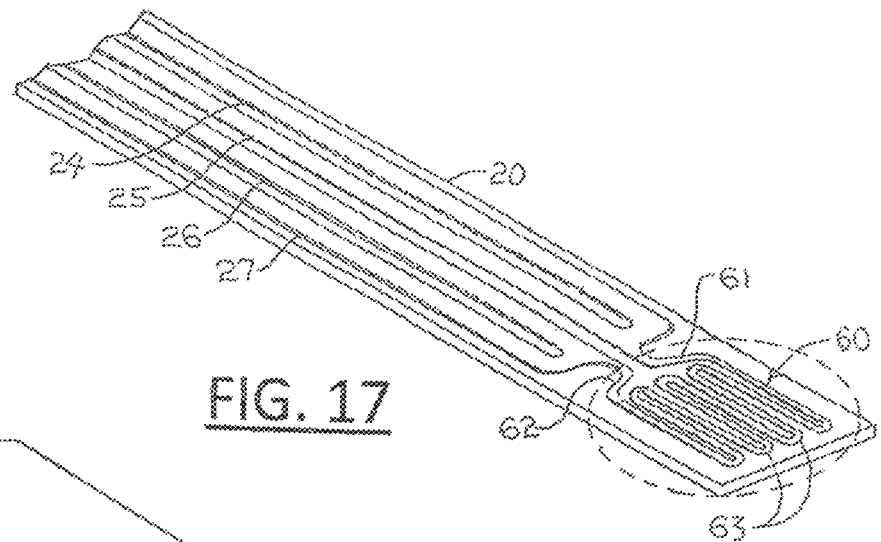
FIG. 17 is an isometric view of an alternate embodiment temperature transducer on the core of the example heat resistant sensor device.

In an alternate embodiment shown in FIG. 17, a temperature transducer 60 (outlined by phantom line circle) is formed on the core 20 along with, and as an extension of the electrical conductors 24, 25, 26, 27 on the ceramic core 20, Like the ceramic temperature transducer 50 described above, this example temperature transducer 60 is configured as a 4-wire Kelvin sensing circuit with the two outside electrical conductors 24, 27 connected to leads 61, 62 of the resistive element 63 to drive a known electric current through the resistive element 63. The two inside electrical conductors 25, 26 are also connected electrically to the leads 61, 62 for detecting the voltage potential across the resistive element 63 that results from the current flow in the resistive element 63 according to Ohm's law as explained above. The resistive element 63 can, but does not have to, be made of the same conductive material as the electrical conductors 24, 25, 26, 27 and fabricated on the core 20 in the same way. Of course, the wiring arrangements could be varied, such as connecting the inside conductors 25, 26 to the leads 61, 62 and using the outside conductors 24, 27 for voltage detection.

Figure 18:
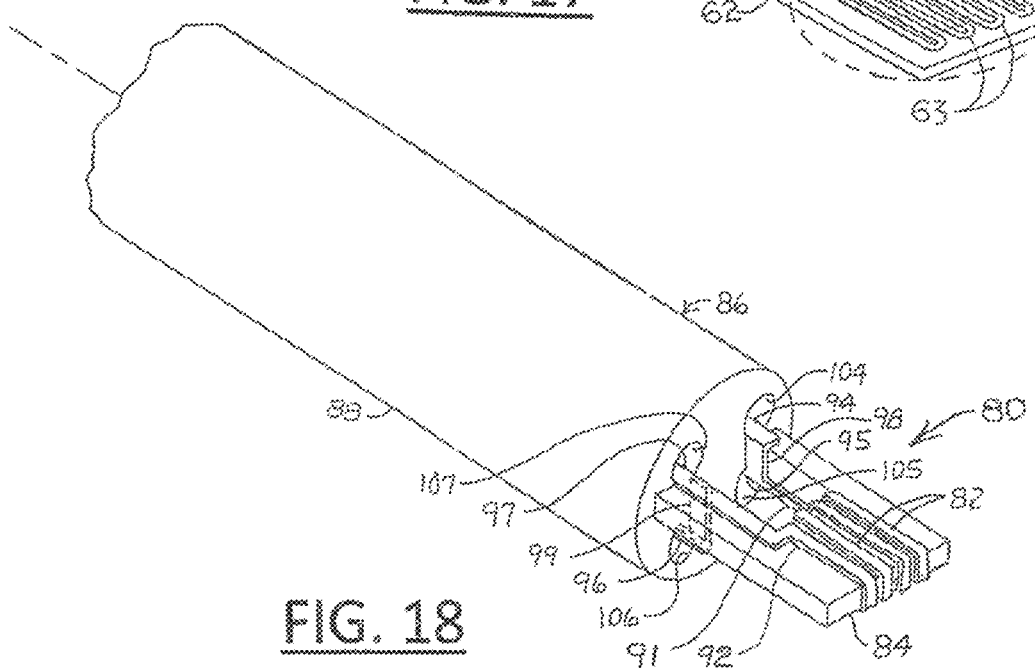
FIG. 18 is an isometric view of another alternate embodiment core with duets for the electrical conductor and a wound temperature transducer.

Another example embodiment temperature sensor 80 shown in FIG. 18 illustrates a resistive wire temperature sensing element 82 wound around a distal end piece 84 of a ceramic core 86, which can be made with the same materials as the core 20 examples described in other example embodiments above. In this example embodiment temperature sensor 80, the distal end piece 84 extends from a cylindrical section 88 of the ceramic core 86, and the electric conductors 94, 95, 96, 97 extend through respective ducts 104, 105, 106, 107 in the cylindrical section 88. For a 4-wire Kelvin sensing circuit, the electrical conductors 94, 97 in the FIG. 18 embodiment 80 extend into, or may be connected electrically to, the opposite first and second ends 91, 92 of the resistive wire temperature sensing element 82 to drive a known electric current through the resistive wire temperature sensing element 82, and the electrical conductors 95, 97 are also connected by jumpers 98, 99 to the respective opposite first and second ends 91, 92 of the resistive wire sensing element 82 for detecting the voltage potential across the resistive wire sensing element 82 that results from the current flow in the resistive wire sensing element 82 according to Ohm's law as explained above.

Depending on the application, the electrical conductors 94, 95, 96, 97 and the resistive wire sensing element 82 can be made with any of the materials described above for the electric conductors 24, 25, 26, 27 in the FIGS. 1-17 examples or the electric conductors 24', 25', 26', 27' for the FIG. 19 embodiment described below. Also, the cylindrical core section 88 with the ducts 104, 105, 106, 107 can be used in any of the other example sensor device embodiments described above or below. Likewise, any of the other core embodiments, for example core 20, can be used instead of the ceramic core 86 in the FIG. 18 embodiment.

Another alternate embodiment temperature transducer 68 shown in FIG. 19 comprises an electrically conductive ceramic bar 70, a first end 71 of which is sandwiched between two electrical conductors 24', 25° that protrude from the distal end 29 of the core 20 and a second end 72 of which is sandwiched between the other two electrical conductors 26', 27'. In this alternate FIG. 19 embodiment, the electrical conductors 24', 25', 26', 27° have somewhat different structures and are not positioned on the core 20 the same as the electrical conductors 24, 25, 26, 27 in the embodiments shown in FIGS. 1-16, but, except for the prime (') designation, the numbering in this description is the same because the function is the same. For instance, for a 4-wire Kelvin sensing circuit, the electrical conductors 24', 27' in the FIG. 19 embodiment are connected respectively to the first end 71 and the second end 72 of the electrically conductive ceramic bar 70 to drive a known electric current through the bar 70, and the electrical conductors 25', 26' are also connected to the respective opposite first and second ends 71, 72 of the bar 70 for detecting the voltage potential across the bar 70 that results from the current flow in the bar 70 according to Ohm's law as explained above.

In the embodiment shown in FIG. 19, electrical conductors 24', 27' are positioned on the top side of the core 20, and the electrical conductors 25', 26' are shown positioned on the bottom side of the core 20, although other arrangements may be used. Electrical connections of the electrical conductors 24', 25', 26', 27' (or mid-portion transition electrodes 24", 25", 26", 27") to the cable 30 (not shown) can be accomplished in the same manner as shown in FIGS. 14 and 14A and described above. Depending on the application, the electrical conductors 24', 25', 26', 27' in the FIG. 19 embodiment can be made with any of the materials as described above for the conductors 24, 25, 26, 27 in FIGS. 6-14B.

An example alternate embodiment temperature sensor 110 is shown in FIG. 20 equipped with the example temperature transducer 68 of FIG. 19. In this example temperature sensor 110, the space in the shield 18 is filled with a potting material 112 for the purpose of making the probe 12 more rigid and more rugged. For example, the potting material 112 adds effective thickness and mass, thus strength, to the core 29, which reduces effects of vibrations and inertial shock. The potting material 112 can also be an electrical insulator to help prevent electrical components from touching and shorting to other electrically conductive components. In this example temperature sensor 110, the electric conductors 24', 25', 26', 27' are the same as described above, but, to enable the distal portion 114 of the probe 12 to withstand and function in the 1,400° C. to 1,800° C. temperature range as indicated in FIG. 20, the electric conductors 24', 25', 26', 27' can be made with any of the noble metals, refractory metals, or conductive ceramic materials described above that can withstand temperatures at least as high as 1,800° C. Optional transition conductors 24", 25", 26", 27" (shown in FIG. 19, but only two of which are visible in FIG. 20) can be provided in the mid-portion 116 of the probe 12 for several reasons. For example, if the mid-portion 116 of the probe 12 is only exposed to moderately lower temperatures than the distal portion 114, e.g., only in a range of 800° C. to 1,400° C. in the mid-portion 116 while the distal portion 114 is exposed to temperatures in a higher range of 1,400° C. to 1,800° C. as indicated in FIG. 20, it may be desirable or more practical to use transition conductors 24", 25", 26", 27" made of less expensive, transition electrical conductors 24", 25", 26", 27" in the mid-portion 116 of the probe 12, especially when conductors 24', 25', 26', 27' in the distal portion 114 of the probe 12 are made from precious materials like platinum. It may also be an attractive option to use transition electrical conductors 24", 25", 26", 27" made of a more rugged material in the mid-portion 116, when conductors 24', 25', 26', 2' in the distal portion 114 of the probe 12 are made from brittle ceramic materials. It may also be an attractive option to use transition electrical conductors 24", 25", 26", 27" made of a material that is easier to fabricate, when conductors 24', 25', 26', 27' in the distal portion 114 of the probe 12 are made from process-intensive materials like SICN (doped or undoped). Such precious, brittle, or difficult to produce or use materials may be needed for conductors 24', 25', 26', 27' at the distal end of the probe 12, where operating temperatures may reach 1,400° C. to 1,800° C., but other materials as explained above can be used for the transition electrical conductors 24", 25", 26", 27" in the mid-portion 116 where temperatures are still high, but not quite so high as at the distal end 114, for example, less than 1,400° C. The optional transition conductors 24", 25", 26", 27" connect the respective electric conductors 24', 25', 26', 27' electrically to the respective electrical conductors in the cable 30. While the two transition conductors 26", 27" are not visible in FIG. 20, portions of them are illustrated in FIG. 19, and persons skilled in the art will understand that such two transition conductors 26", 27" can be connected electrically to the electric conductors 26', 27' in the same manner as the two transition conductors 24", 25" connect electrically to the electric conductors 24', 25'.

Figure 21A:
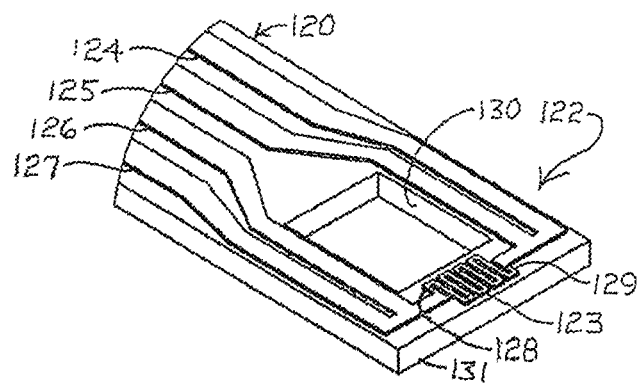
FIG. 21A is an enlarged distal end portion of the core, electric conductors, and transducer of FIG. 21.
Figure 21:
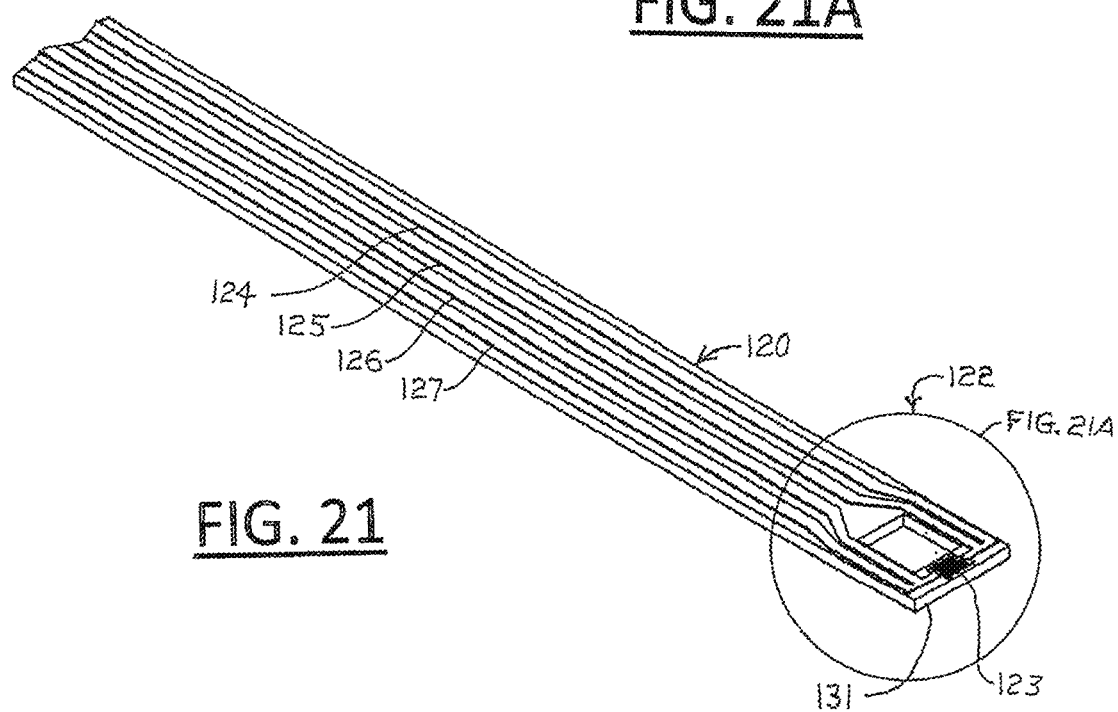
FIG. 21 is an isometric view of another alternate core with electric conductors and transducer that can be used as a pressure transducer, flow rate transducer, or fluid level transducer.

An alternative example ceramic core 120 shown in FIGS. 21 and 21A with electrical conductors 124, 125, 126, 127, and transducer 122 is usable in a probe 12 as a temperature sensor with or without the optional hole 17 in the optional shield 18 (FIGS. 1-5) similar to the transducer 60 in the FIG. 17 embodiment. Alternatively, this alternative example ceramic core 120 and transducer 122 in FIGS. 21 and 21A can be used as a pressure, fluid flow, or fluid level sensor. Like the example temperature transducer 60 in FIG. 17, the transducer 122 in FIGS. 21 and 21A comprises a thermal resistive element 123 in which electrical resistance varies as a function of temperature. Also, like the temperature transducer 60 and electrical conductors 24, 25, 26, 27 in the FIG. 17 embodiment, the electrical conductors 124, 125, 126, 127 and transducer 122 in this FIG. 21 example embodiment are configured as a 4-wire Kelvin sensing circuit with the two outside electrical conductors 124, 127 connected to leads 128, 129 of the thermal resistive element 123 of the transducer 122 to drive an electric current through the thermal resistive element 123. The two inside electrical conductors 125, 126 are also connected electrically to the leads 128, 129 of a thermal resistive element 123 for detecting the voltage potential across the thermal resistive element 123 that results from the current flow in the thermal resistive element 123 according to Ohm's law as explained above. Alternatively, the inside conductors 125, 126 can be used to drive the electric current, and the voltage can be detected on the outside conductors 124, 127. The thermal resistive element 123 can be made of the same conductive material as the electrical conductors 24, 25, 26, 27 described above for the sensor device 10 in FIGS. 1-15 and can be fabricated on the non-conductive ceramic core 120 in the same way as the electrical conductors 25, 25, 26, 27 are fabricated on the core 20. In that 4-wire Kelvin circuit configuration, the transducer 122 can be used as a temperature sensor transducer in the same manner as the transducer 60 described above for the FIG. 17 embodiment.

For use of the example ceramic core 120, electrical conductors 124, 125, 126, 127, and transducer 122 in FIGS. 21 and 21A as a fluid pressure sensor, the thermal resistive element 123 of the transducer 122 is positioned on the ceramic core 120 in a place and manner that exposes the thermal resistive element 123 of the transducer 122 to a fluid (not shown in FIGS. 21 and 21A) for which the pressure is to be measured, and the transducer 122 functions as a wire anemometer for sensing or measuring pressure of the fluid. In FIGS. 21 and 21A, the thermal resistive element 123 of the transducer 122 is positioned adjacent to the distal end 131 of the ceramic core 120, and, if an optional shield 18 is provided (see FIGS. 1-5), the shield 18 can be provided with the hole 17 (see FIGS. 1 and 5) to allow fluid pressure inside the shield 18 around the thermal resistive element 123 (FIGS. 21 and 21A) to equalize with the fluid pressure outside the shield 18 that is to be sensed or measured. The ceramic core 120 can be made from any of the materials described above for the core 20 in FIGS. 1-44. The electric conductors 124, 125, 126, 127 and the thermal resistive element 123 can be made of the same conductive material as the electrical conductors 24, 25, 26, 27 in FIGS. 1-14 and can be fabricated on the core 120 in the same way as the electrical conductors 24, 25, 26, 27 are fabricated on the core 20 in FIGS. 1-14.

The electric current driven through the thermal resistive element 123 of the transducer 122, for example, by the 4-wire Kelvin sensing circuit described above, creates heat in the thermal resistive element 123, which dissipates by conduction into the molecules of the surrounding fluid. The electrical resistance of the thermal resistive element 123 rises as the temperature of the thermal resistive element 123 increases, and the electrical resistance of the thermal resistive element 123 decreases as the temperature of the thermal resistive element 123 decreases. Therefore, as the heat generated by the electric current in the thermal resistive element 123 is dissipated away from the thermal resistive element 123 by conduction into the fluid molecules surrounding the thermal resistive element 123, the thermal resistive element 123 cools and electrical resistance in the thermal resistive element 123 decreases. The higher the pressure of the fluid surrounding the thermal resistive element 123, the more fluid molecules there are to conduct heat away from the thermal resistive element 123. Conversely, the lower the pressure of the fluid surrounding the thermal resistive element 123, the fewer molecules there are to conduct heat away from the thermal resistive element 123. Consequently, higher pressure fluid provides more conduction of heat away from, thus more cooling of, the thermal resistive element 123, and lower pressure fluid provides less conduction of heat away from, thus less cooling of, the thermal resistive element 123. Therefore, electrical resistance of the thermal resistive element 123 varies as a function of the pressure of the gas (e.g., inverse relationship), and the resulting higher or lower electrical resistance in the thermal resistive element 123 can be detected and measured in a number of ways that are well-known to persons skilled in the art. For example, but not for limitation, if a constant current is driven through the thermal resistive element 123, lower resistance resulting from a higher gas pressure is manifested in a lower voltage across the thermal resistive element 123, and higher resistance resulting from a lower gas pressure is manifested in a higher voltage across the thermal resistive element 123. Such voltage changes are detectable and measureable. Conversely, if a current is driven through the thermal resistive element 123 at a constant voltage, lower resistance resulting from a higher gas pressure is manifested in a higher current flow through the thermal resistive element 123, and higher resistance resulting from a lower gas pressure is manifested in a lower current flow through the thermal resistive element 123. The voltage or current measurements can be associated empirically to specific pressure values.

The ceramic core 120 has an aperture 130 to at least partially isolate the thermal resistive element 123 adjacent to the distal end 139 of the core 20 from the rest of the core 20, which minimizes conduction of heat generated in the thermal resistive element 123 into the rest of the core 20. Any heat lost to the core 20, instead of being dissipated into the surrounding fluid medium, is heat loss that is not affected by, thus is insensitive to, a pressure change in the fluid medium. Therefore, the aperture 130, which minimizes heat loss to the core 20, enhances sensitivity of the transducer 122 to pressure changes in the surrounding fluid medium.

While not visible in the isometric views of FIGS. 21 and 21A, a separate temperature sensor circuit, for example, but not for limitation, the temperature transducer 60, electrical conductors 24, 25, 26, 27, and other components shown in FIG. 17, can be placed on the bottom of the core 120 in FIG. 21 to provide temperature compensation for the pressure measurements made with the transducer 122. Temperature compensation is provided by measurement of the temperature of the temperature transducer on the core 120 independent of the gas pressure, e.g., independent of any change in electric signals due to heat dissipation from the transducer 122 into the gas, and then using that measurement to correct signals from the pressure transducer 122 due to temperature as opposed to pressure. Analog circuits and digital signal processing for implementation of temperature compensation for signals from anemometer pressure sensors are well-known to persons skilled in the art and can be used for implementation of temperature compensation for pressure measurements with the transducer 122.

Any of the example transducers 50, 60, 68, 80, 122 described above can also be used as flow rate sensors. Referring to the transducer 122 in FIGS. 20 and 21A as an example, the thermal resistive element 123 of the transducer 122 can be exposed to a flowing fluid for which flow rate is to be measured. Alternatively, the thermal resistive element 123 can be placed in contact with an effective heat transfer material (not shown in FIGS. 21 and 21A) that is exposed to the flowing fluid and that conducts heat from the thermal resistive element 123 to the flowing fluid. The faster the fluid flows over or in contact with the thermal resistive element 123 or the heat transfer material (not shown), the faster heat generated in the thermal resistive element 123 from current flow in the thermal resistive material 123 is conducted away from the thermal resistive element 123. Conversely, the slower the fluid flows over or in contact with the thermal resistive element 123 or the heat transfer material (not shown), the slower heat generated in the thermal resistive material 123 from current flow in the thermal resistive material 123 is conducted away from the thermal resistive element 123. Therefore, according to the same principle described above for the pressure measuring application of the transducer 122, the faster the fluid flows, the more the heat that is generated in the thermal resistive material 123 dissipates and the thermal resistive material cools, which results in lower electrical resistance in the thermal resistive material 123. Conversely, the slower the fluid flows, the slower the heat from the thermal resistive material 123 dissipates, which results in higher electrical resistance in the thermal resistive material 123. Such changes and variations are detectable and measureable electrically, for example, in voltage or current measurements, as explained above, and are usable for flow rate measurements. Temperature changes in the flowing fluid affect the voltage or current measurements. Therefore a temperature sensor (not shown) for temperature compensation as described above can be used to correct the voltage or current measurements for effects of temperature on the fluid flow measurements. The voltage or current measurements can be associated empirically to specific flow rate values for particular fluids.

Figure 22:
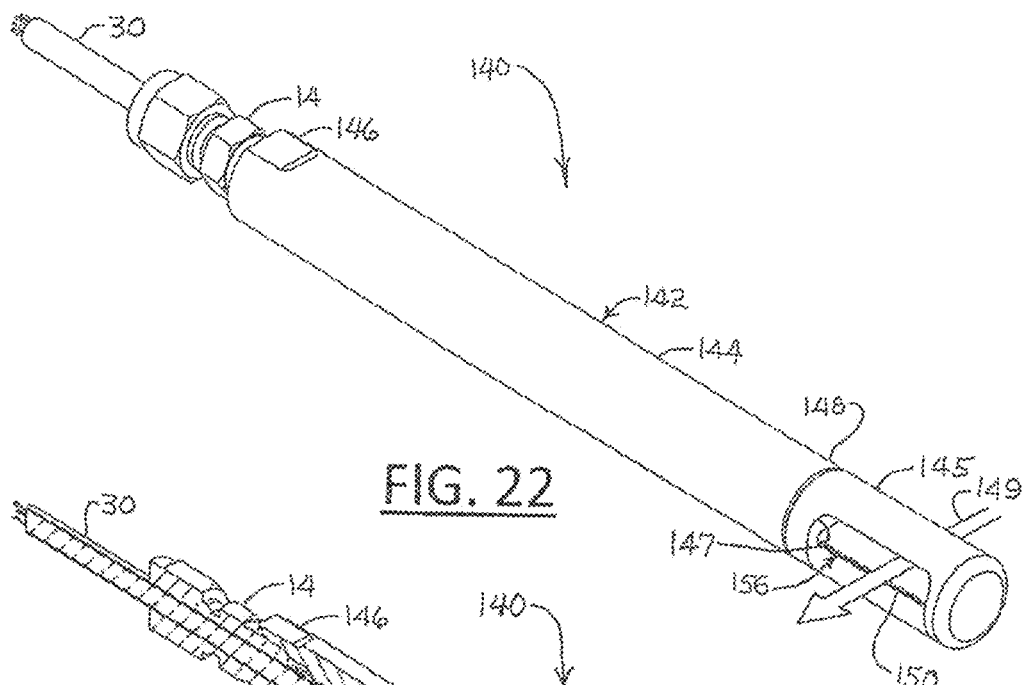
FIG. 22 is an isometric view of an alternative example fluid flow sensor for measuring fluid flow rate of very high temperature fluids.
Figure 23:
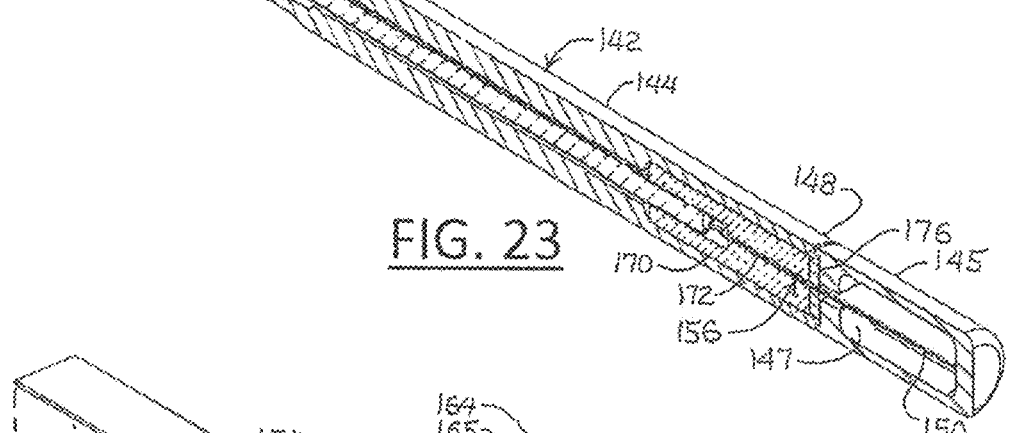
FIG. 23 is an isometric cross-section view of the example fluid flow sensor in FIG. 22.
Figure 25:
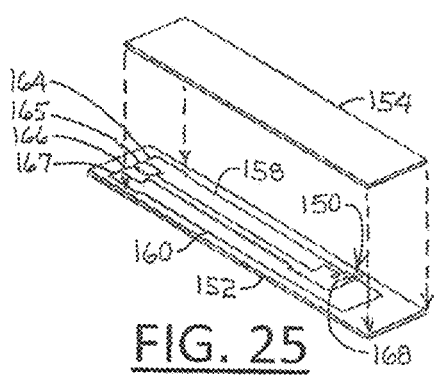
FIG. 25 is an isometric, exploded view of an example fluid flow transducer shown in the example fluid flow sensor in FIG. 22.
Figure 24:
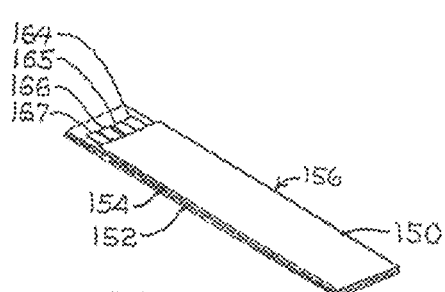
FIG. 24 is an isometric view of the example fluid flow transducer in the example fluid flow sensor shown in FIG. 22.

The optional shield 18 (FIGS. 1-5) would interfere with flow of the fluid over the transducer 122, so it may not be suitable for flow rate sensor applications of the probe 12, at least not without modifications or variations. Accordingly, an example flow meter sensor 140 with a modified probe 142 that accommodates those requirements is shown in FIGS. 22-24. In this example flow meter sensor 140, an elongate barrel 144 has a proximal end 146 mounted on the fitting 14 for extending into a chamber or pipe (not shown) in which a fluid flows, and a shield 145 is mounted on the distal end 148 of the barrel 144. The barrel 144 houses and supports a transducer 150 that extends outwardly from the distal end 148 of the barrel 144 into the shield 145. The shield 145 has an aperture 147 extending transversely through the shield 145 to allow a fluid to flow over the transducer 150, as indicated by the flow arrow 149 in FIG. 22, while the shield 145 provides some protection for the transducer 150.

The transducer 150 in the example flow meter sensor 140 is sandwiched between a base core section 152 and a cover core section 154 laminated together to form a core 156 that supports and protects the transducer 150 and associated electrical conductors 158, 160 and contact terminals 164, 165, 166, 167. While any of the example cores 20, 86, 120 and transducers 22, 50, 60, 68, 122 described above could be used, the transducer 150, with the thermal resistive element 168 sandwiched between the base core section 152 and the cover core section 154, provides some additional protection for the thermal resistive element 168, thus durability and ruggedness. In this example, the base core section 152 and cover core section 154 provide a heat transfer function, i.e., heat transfer materials, to transfer heat from the thermal resistive element 168 to the fluid flowing over the transducer 150, since the cover core section 154 and the base core section 152 prevent direct contact of the fluid flow 149 with the thermal resistive element 168. In this example, two of the contact terminals 164, 165 are connected to one of the electrical conductors 158 and the other two contact terminals 166, 167 are connected to the other electrical conductor 160, and the conductors 158, 160 are connected to opposite ends of the thermal resistive element 168 of the transducer 150 to provide a 4-wire Kelvin sensing circuit as explained above. The faster the fluid flows over the transducer 150, the more heat is dissipated from the thermal resistive element 168, which changes the resistance of the thermal resistive element 168, as explained above. As also explained above, such changes in resistance can be detected and measured by changes in voltage or current flow, which is indicative of the fluid flow rate of the fluid flow 149 over the transducer 150.

A potting compound 170, e.g., ceramic cement, similar to the ceramic cement or potting compound 39 in FIG. 14A described above, is provided to anchor the proximal portion 172 of the core 156 in the barrel 144 and to provide a seal between the outside of the barrel 144 and the inside of the barrel 144, where the cable 30 is positioned. The cable 30 extends from the rear end of the fitting 14, which would be outside of a chamber or pipe (not shown) in which the flow meter sensor 140 would be mounted for use, through the fitting 14 and through a bore 174 in the barrel 144, to or almost to the proximal end of the core 156, where the wires in the cable 30 are connected to the contact terminals 164, 165, 166, 167 on the core 156. Therefore, the sealing function provided by the potting compound 170 prevents leakage of fluids from inside the chamber or pipe (not shown), through the barrel 144, to outside of the chamber or pipe (not shown). In this example flow meter sensor 140, a seal 176 is also provided at the distal end of the barrel 144 to prevent leakage of a fluid that is being measured for flow rate from leaking into the barrel 144 to supplement the sealing function of the potting compound 170. The seal 176 can be made of, for example, glasses (fritted or glaze), metals (brazed, reflowed, or pressed fit), or ceramics (cements or press fit).

The electrical connections of the wires in the cable 30 to the contact terminals 164, 165, 166, 167 in the example flow meter sensor 140 (FIGS. 22-25) can be made in the same way as the electrical connections 48, 49 shown in FIG. 14A and described above, although other suitable connections can also be used. Core 156, electrical conductors 156, thermal resistive element 168, ceramic or potting compound 170, and shield 145 can be made with any of the respective materials described above for the cores, electrical conductors, thermal resistive materials, and shields in other embodiments described above.

The example flow rate sensor embodiments described above can also be used the sensing the level of a fluid in a container or chamber (not shown). For example, a liquid will conduct heat away from the thermal resistive element 123 of the transducer 122 faster and more efficiently than air or some other gas. Therefore, if the thermal resistive element 123 is positioned at a level in the container or tank that is above a liquid in the container or chamber, thus in air or other gas, the air or other gas will not conduct heat away from the thermal resistive element 123 very fast or efficiently, so the electrical resistance of the thermal resistive element 123 will be higher than if the thermal resistive element 123 was submerged in the liquid. Then, if the liquid in the container or chamber rises to a high enough level to contact the thermal resistive element 123 or to contact the optional heat transfer material discussed above (not shown), the liquid will conduct heat away from the thermal resistive element 123 faster and more efficiently than the air or other gas, which will be manifested in a detectable change in voltage across the thermal resistive element 123 or a detectable change in current flow through the thermal resistive element 123 as explained above. Conversely, the liquid level in the container or chamber drops below the level of the thermal resistive element 123, the change from liquid in contact with the thermal resistive element 123 to air or other gas in contact with the thermal resistive element 123 is manifested as a detectable change in voltage or current, as explained above.

An example capacitive pressure sensor 210 for measuring gas pressures in very high temperature conditions is shown in FIGS. 26-29, In this example capacitive pressure sensor 210, the core 220 and electrical conductors 224, 225, 226, 227 can be made of the same respective materials as described above for the core 20 and electrical conductors 24, 25, 26, 27 of the example sensor device 10 in FIGS. 1-14 above. The electrical connections of the electrical conductors 224, 225, 226, 227 to electrically conductive wires 240 (only two of which are visible in FIG. 26) in this example capacitive, pressure sensor 210 for conducting signals from the capacitive pressure transducer 222 to the capacitance measurement electronics 290 can be the same as the electrical connections of electrical conductors 24, 25, 26, 27 to the electrically conductive wires 40, 42, 44, 46 of the example sensor device 10 described above and shown in FIGS. 1-14A, although other electrical connection techniques could be used. An optional shield 218 shown in FIG. 26 surrounds and encloses the core 220 and capacitive pressure transducer 222 for protection. The shield 218 can be made of the same materials as described above for the shield 18 in the sensor 10. Also, the shield 218 has a hole 217 extending from the interior of the shield 218 to the exterior of the shield 218 so that fluid pressure inside the shield 218 can equalize with fluid pressure outside of the shield 218 for measurement by the capacitive pressure transducer 222. The fittings 214 configured, for example, as externally threaded pipe adapters, provide a mounting structure for mounting the probe 212 in a wall of a chamber (not shown) or pipe (not shown) so that the probe 212 extends into such chamber or pipe in order to measure a pressure of a fluid in such chamber or pipe. Again, other types of fittings, for example, welded, flanged, machined, or adhered fittings instead of threaded fittings can be used instead of threaded fittings.

An example capacitive pressure transducer 222 for the capacitive pressure sensor 210, as illustrated in FIGS. 28 and 29, can be made entirely with materials that can withstand the very high temperatures described above, i.e., as high as 1,800° C. Therefore, the capacitive pressure transducer 222 can be placed in the distal end of the probe 212, as shown in FIG. 22, where the very high temperature gases for which pressure is to be measured are located (see, e.g., the temperature ranges illustrated in FIG. 20), while the capacitance signal conditioning electronics 290 are placed outside of the chamber or pipe (not shown) that contain the very high temperature gases. Accordingly, the example capacitive pressure transducer 222 comprises a ceramic housing 252, which includes a resiliently deformable, ceramic membrane 254, which encloses and hermetically seals a space 256. The housing 252 is supported above the core 220 by one or more spacers, for example, spacers 258, 260, at least one of which is electrically conductive to provide an electrical connection between an electrode 264 on the membrane 254 and an electrical conductor, e.g., the electrical conductor 227, on the core 220 as described in more detail below. The membrane 254 can be formed as an integral part of the housing 252, or it can be formed separately and then adhered or otherwise attached to the housing 252 to enclose the space 256. When fluid pressure outside the housing 252 and space 256 increases, such increased pressure causes the membrane 254 to flex or deform toward or into the space 256 as illustrated, for example, in FIG. 29. Conversely, decreased pressure outside the housing 252 causes the membrane 254 to flex or deform away or outwardly from the space 256. A first electrode 262, for example, a thin conductive material, is formed on or attached to the core 220 a distance spaced apart from the membrane 254. A second electrode 264, for example, a thin conductive material, is formed on or attached to the membrane 254 and flexes or deforms in conformance with the membrane 254 toward or away from the first electrode 262 according to the fluid pressure outside of the space 256. As such, the first and second electrodes 262, 264 form and function as a variable electrical capacitor, as indicated diagrammatically in FIGS. 28 and 29 by the capacitor symbol 266. The capacitance of the capacitor 266 varies as a function of the distance between the first and second electrodes 262, 264, which varies as a function of fluid pressure outside of the housing 252 pressing on the membrane 254. An optional dielectric material 268 can be positioned between the first and second electrodes 262, 264 to increase the capacitance between the first and second electrodes 262, 264. Such a dielectric material 268 has to be able to withstand the very high temperatures of the fluid for which the pressure is being measured by the capacitive pressure sensor 210. Examples of such dielectric materials may include, but are not limited to, alumina, beryllium oxide, magnesia, halfnia, and barium titanate.

In the example capacitance pressure transducer 222 illustrated in FIGS. 28 and 29, the second electrode is formed or attached on the surface of the membrane 254 that is opposite the hermetically sealed space 256, i.e., the surface of the membrane 254 that is outside of the hermetically sealed space 256. The first electrode 262 is connected electrically to, or is an extension of, one of the electrical conductors, e.g., the electrical conductor 224, on the core 220. The second electrode 264 is connected electrically to another one of the electric conductors, e.g., the electrical conductor 227, on the core 220 via the spacer 260, which is an electrically conductive material, such as any of the Noble or refractory metals or alloys mentioned above that can withstand the very high temperatures of the fluid for which the pressure is being measured. Therefore, the variable capacitor 266 can be charged and discharged through the two electrical conductors 224, 227, and the capacitance of the variable capacitor 266 can be detected and measured electrically by any of a number of techniques known to persons skilled in the art. For example, but not for limitation, oscillator based, charged based, timer based, and bridge based analog electrical systems as well as variety of digital based systems known to persons skilled in the art can be used to detect and measure the capacitance of the sensor. Specific values of pressure for specific values of measure capacitance can be determined empirically and used for outputting pressure measurements from the capacitive pressure transducer 222.

The housing 252, including the membrane 254, can be made with any of the ceramic materials as described above that can withstand the very high temperatures of the gases for which pressure is to be measured with the capacitive pressure transducer 222. In order to provide the electrically conductive components and interconnections of the capacitive pressure transducer 222 as described above and to provide a very small, precisely controlled gap between the first and second electrodes 262, 264, e.g., in a range of 0.5 to 50 micrometers, for a practically sized transducer 222 with enough capacitance to provide accurate pressure measurements, the capacitive pressure transducer 222 can be constructed with ultrasonic, thermosonic, or thermocompression flip chip bonding techniques. Pressure, heat, or ultrasonic energy can then be applied to the spacers 258, 260 to form continuous electrical connection to the electrical conductor 227 while precisely controlling the desired gap between the first and second electrodes 262, 264. The temperature capability of the joint is largely a function of the maximum use temperature of the materials used. For example, in the case of silver, gold, or platinum, that maximum temperature, thus temperature capability of the joint, would be the melting temperature of the silver, gold, or platinum. Platinum would max out at about 1,760° C. For other materials, for example refractories, the temperature capability of the joint would be the temperature at which complete oxidation would occur.

As shown in FIGS. 26 and 27, a temperature transducer 270 can be provided on the core 220 for temperature compensation. The temperature transducer 270 can, but does not necessarily have to, be the same as or similar to any of the temperature transducers described above, Temperature compensation is provided, because the volume of the space 256 in the housing 252 varies as a function of temperature according to the Ideal Gas Law, i.e., when held at a given pressure, the volume of a gas is directly proportional to the temperature of the gas. Therefore, a decrease in temperature, even without a change in pressure outside of the housing 252, will cause the membrane 254 to flex into the space 256, which will decrease the capacitance between the first and second electrodes 262, 264. Conversely, an increase in temperature will cause the membrane 254 to Ilex outwardly away from the space 256, which will increase the capacitance between the first and second electrodes 262, 264. Inclusion of a temperature transducer 270 allows the effect of temperature on capacitance to be determined empirically and the capacitance measurements to be compensated in a manner that provides accurate pressure measurements, regardless of temperature, according to principles and with analog or digital circuits that are conventional and understood by persons skilled in the art.

To minimize capacitance measurement errors due to unknown capacitances to ground, spurious voltages, and capacitances from shielding in cables, the capacitance signal conditioning electronics 290 for the example capacitive pressure sensor 210 in FIG. 26 are provided close to the capacitive pressure transducer 222, for example, in a ceramic electronics encasement 292 attached to the fittings 214. The packaging of the capacitive pressure sensor 210 constructed with materials that can withstand the very high temperatures, as described above, can be complemented by constructing the signal conditioning electronics 290 with high temperature components, including ceramic multi-chip modules (MCMs), high temperature PCBs, high temperature passive devices (resistors, and capacitors), and high temperature silicon carbide (SiC) and silicon on insulator (SOI) active devices (amplifier, diodes, microcontrollers, etc.), which is an advantage due to benefit of having signal conditioning electronics close to the sensor element which can improve sensor sensitivity and reduce noise. Therefore, the entire capacitive pressure sensor 210 can withstand and operate reliably in such very high temperature conditions.

Figure 30:
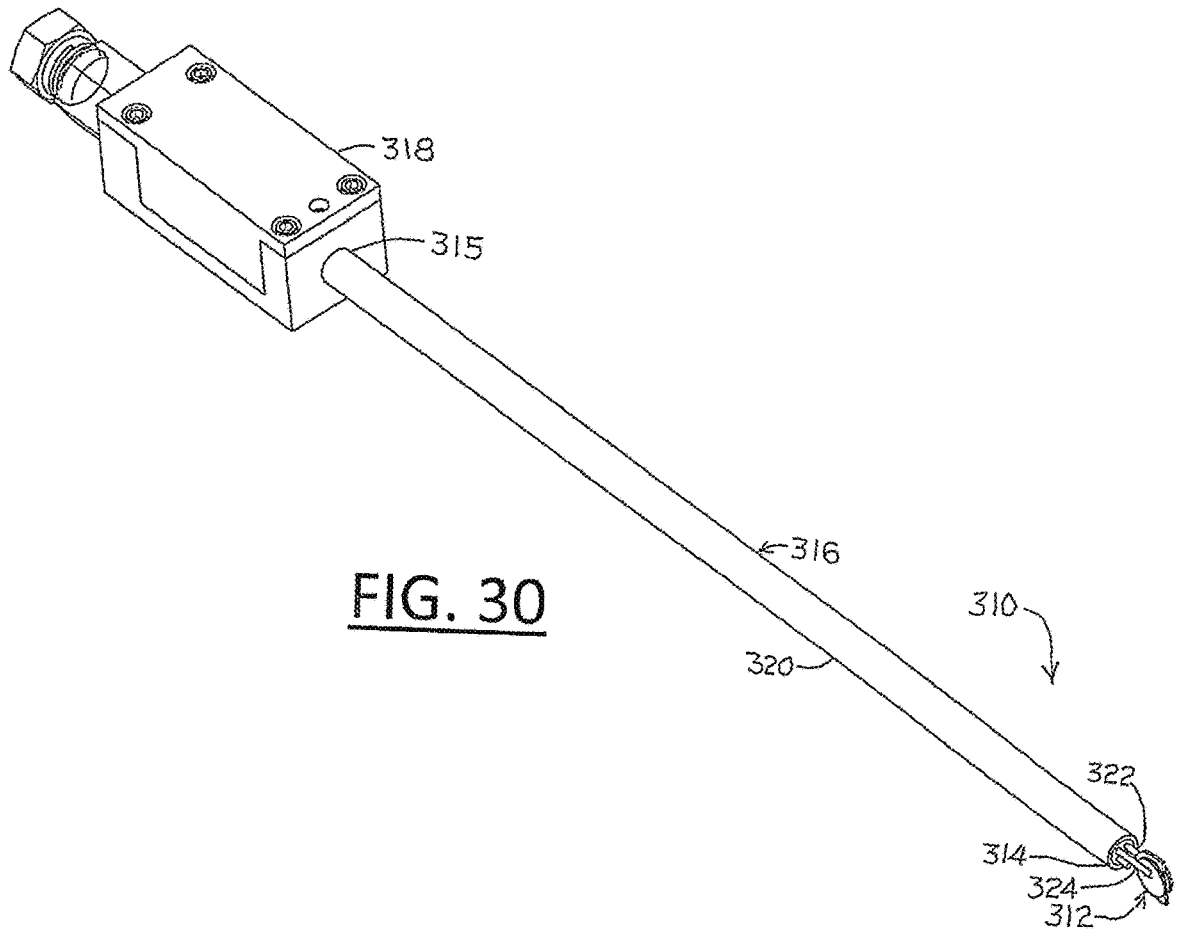
FIG. 30 is an isometric view of an alternative example heat-resistant capacitive pressure sensor that is compact and resistant to high temperature corrosive fluids.
Figure 31:
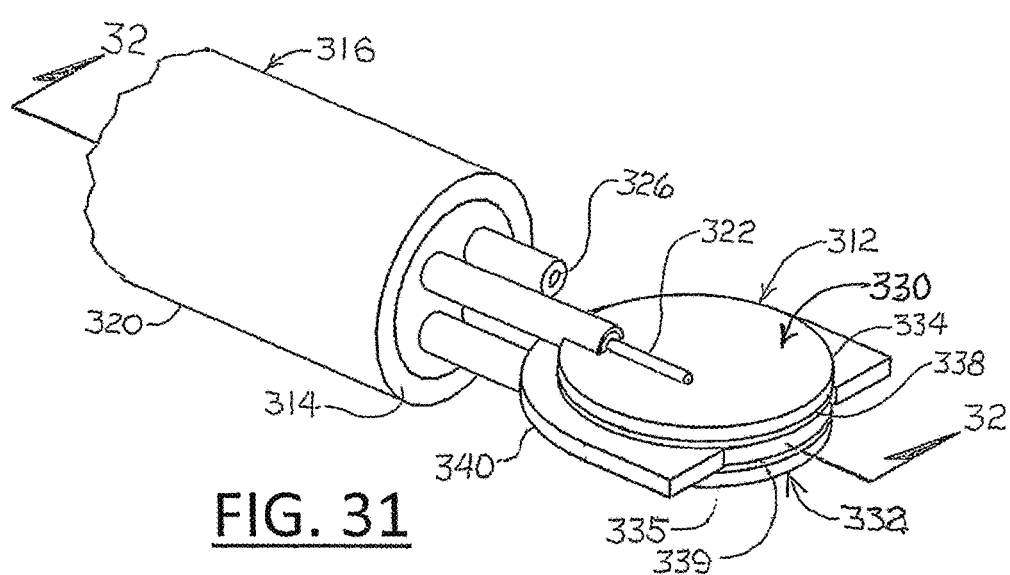
FIG. 31 is an enlarged isometric view of the capacitive pressure transducer of the alternate example heat-resistant capacitive pressure sensor in FIG. 30.
Figure 32:
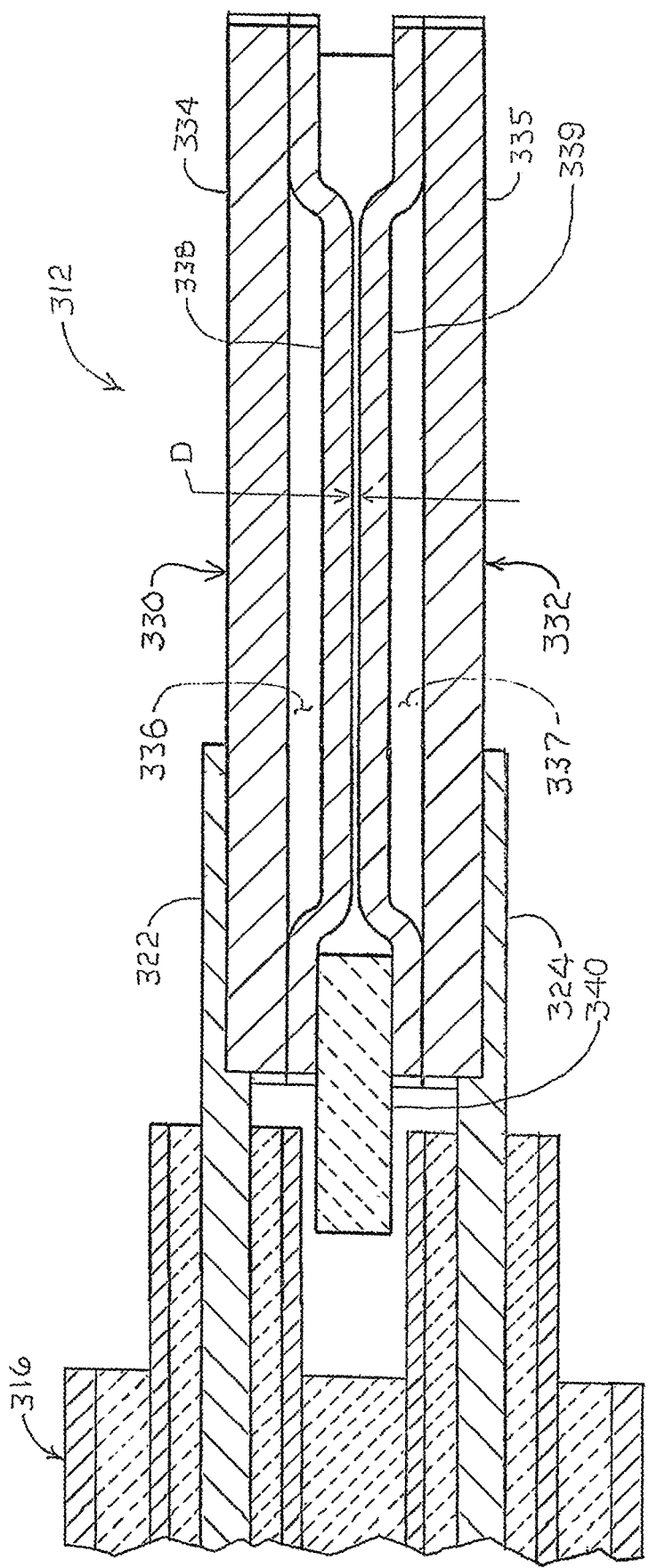
FIG. 32 is a further enlarged cross-section view of the alternative example heat-resistant capacitive pressure transducer in FIGS. 30 and 31 taken along the cutting plane line 32-32 in FIG. 31.

An alternate example heat-resistant capacitive pressure sensor 310 shown in FIGS. 30-32 is not only capable of withstanding and functioning in very high temperatures, but is also resistant to corrosive fluids. As illustrated in FIG. 30, the capacitive pressure sensor 310 comprises a capacitive pressure transducer 312 mounted on the distal end 314 of a probe 316, the proximal end 315 of which extends from an electronics encasement 318 that houses capacitive signal conditioning electronics (not shown). The electronics encasement 318 and the capacitive signal conditioning electronics can be the same as, or similar to, the ceramic electronics encasement 292 and capacitive signal conditioning electronics 290 shown in FIG. 26 and described above. The probe 316 can comprise a mineral insulated cable 320 that is corrosion resistant and can withstand very high temperatures. Such mineral insulated cables are well-known to persons skilled in the art and commercially available from myriad manufacturers and suppliers. The mineral insulated cable 320 shown in FIGS. 30-32 comprises four electric conductors 322, 324, 326, 328, but only two of the electric conductors 322, 324 are used for the example capacitive pressure transducer 312 as will be explained in more detail below. The other two electric conductors 326, 328 can be used for other purposes, for example, a temperature sensor, if desired.

Referring now primarily to FIGS. 31 and 32, the example capacitive pressure transducer 312 comprises a first pressure-sensitive element 330 and a second pressure-sensitive element 332 disposed in juxtaposed relation to each other.

Each of the first and second pressure-sensitive elements 330, 332 comprises a housing, e.g., first housing 334 and second housing 335, respectively, that encloses and hermetically seals a space, e.g., a first space 336 and a second space 337, respectively. One side of the first housing 334 includes an elastic, resiliently deformable membrane 338, which can be formed as an integral part of the first housing 334, or the first membrane 338 can be formed separately and then welded, adhered, or otherwise attached to the first housing 334 to enclose the first space 336. Similarly, one side of the second housing 335 includes an elastic, resiliently deformable membrane 339, which can be formed as an integral part of the second housing 335, or the second membrane 339 can be formed separately and then welded, adhered, or otherwise attached to the second housing 335. Accordingly, the respective first and second membranes 338, 339 are positioned in juxtaposed, closely spaced apart relation to each other, as indicated by the distance D in FIG. 32, to form a capacitor as will be explained in more detail below. An optional spacer 340 positioned between the peripheral, interfacing surfaces of the first and second housings 334, 335 provide support to the respective pressure-sensitive elements 332, 334, thus structural stability to the capacitive pressure transducer 312. For structural integrity in corrosive, high temperature fluids, the first and second housings 334, 335, including the first and second membranes 338, 339, can comprise any of a variety of metals that can withstand very high temperatures as discussed above and that are resistant to corrosion. For the example capacitive pressure transducer 312, such metals for the first and second housings 334, 335 are also electrically conductive to form a capacitor as will be explained in more detail below. Such metals may include any of the Noble or refractory metals or alloys mentioned above that can withstand the very high temperatures of the fluid for which the pressure is being measured. In lieu of metals, the first and second membranes 338, 339 can be electrically conductive ceramics or metal coated insulating materials, such as metal coated ceramics, metal coated crystalline materials (e.g., metal coated sapphire or metal coated silica), or metal coated amorphous crystalline materials (e.g., metal coated amorphous sapphire or metal coated amorphous silica). Also, the respective first and second membranes 338, 339 can be dished toward each other inside the spacer 340 as illustrated in FIGS. 31 and 32 for compactness, e.g., for positioning the first and second membranes 338, 339 in closely spaced-apart relation to each other as needed for particular pressure and capacitance ranges, while also accommodating the spacer 340 between the first and second pressure-sensitive elements 332, 334. Accordingly, the convexly dished shape of the first and second membranes 338, 339 enables use of a spacer 340 that is thicker than the gap or distance D between the first and second membranes 338, 339, which enhances ease of fabrication and assembly of the capacitive pressure transducer 312. Since the first and second housings 334, 335 are electrically conductive to form a capacitance between them when a voltage is applied, as explained below, the spacer 340 is non-electrically conductive or otherwise electrically insulated to avoid electrical conduction between the first and second housings 334, 335 in order to maintain the capacitance between the first and second membranes 338, 339.

As best seen in FIG. 32, a first one of the electric conductors of the mineral insulated cable 320, e.g., the electric conductor 322, is connected electrically to the electrically conductive metal or other electrically conductive material of the first housing 334, and a second one of the electric conductors of the mineral insulated cable 320 is connected electrically to the electrically conductive metal or other electrically conductive material of the second housing 335. The first and second metal housings 334, 335, including the first and second membranes 338, 339 can comprise an electrically conductive material, such as any of the Noble or refractory metals or alloys or other electrically conductive materials mentioned above that can withstand the very high temperatures of the fluid for which the pressure is being measured. Therefore, when a voltage is applied across the two electric conductors 322, 324, a capacitance is created between the first membrane 338 and the second membrane 339, which, as explained above and shown in FIG. 32, are separated by the distance D. This capacitance relationship between the respective first and second membranes 338, 339 of the first and second metallic housings 334, 335 is illustrated diagrammatically in FIG. 33 with the capacitor symbol 342.

Figure 34:
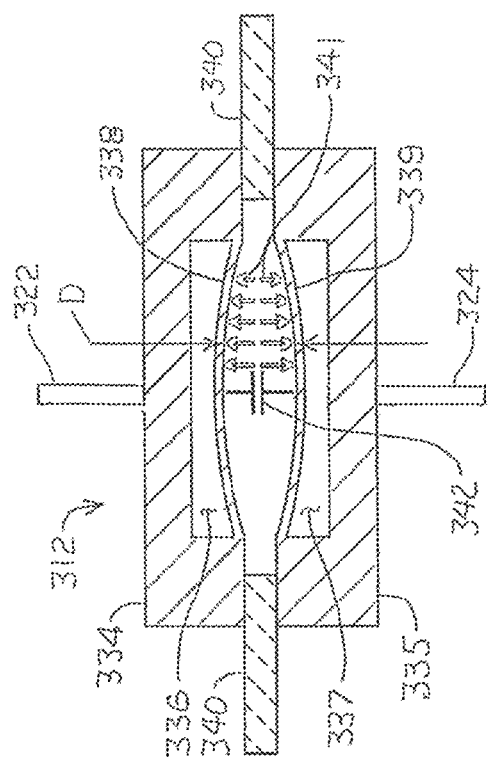
FIG. 34 is a diagrammatic view of the metal version of the capacitive pressure transducer of FIGS. 30-33 when exposed to an increased pressure.
Figure 33:
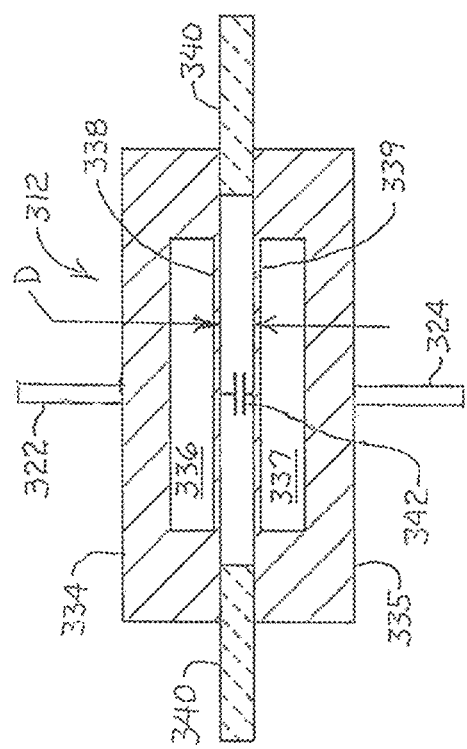
FIG. 33 is a diagrammatic view of a metal version of the capacitive pressure transducer in FIGS. 30-33.

When fluid pressure outside the first and second housings 334, 335, thus outside the first and second spaces 336, 337, increases, such increased pressure causes the first and second membranes 338, 339 to flex or deform toward or into the respective first and second spaces 336, 337, thus away from each other as illustrated diagrammatically, for example, in FIG. 34 by the arrows 341. Conversely, decreased pressure outside the housings 334, 335 causes the first and second membranes 338, 339 to flex or deform away or outwardly from the respective spaces 336, 337, thus toward each other. As such, the first and second membranes 338, 339 form and function as a variable electrical capacitor, as indicated diagrammatically in FIGS. 33 and 34 by the capacitor symbol 342. The capacitance of the capacitor 342 varies as a function of the distance D between the first and second membranes 338, 339, which varies as a function of fluid pressure outside of the first and second housings 334, 335 pressing on the first and second membranes 338, 339. The distance D is a value greater than zero that provides a detectable and measurable capacitance that can be correlated empirically or otherwise to the pressure being measured and the first and second membranes 338, 339 have indices of elasticity that facilitate changes in the distance D that produce detectable and measurable changes in the capacitance between the first and second membranes 338, 339, which correlate to changes in the pressure, as will be understood by persons skilled in the art. As can be appreciated from the diagrammatic illustrations in FIGS. 33 and 34 and the related explanation above, the two juxtaposed membranes 338, 339 moving away and toward each other as a function of pressure provides more, twice as much change in the distance D, thus change in capacitance, for a given pressure change as compared to the capacitive pressure transducer 222 in FIGS. 26-29 that has only one membrane 254. Accordingly, the example capacitive pressure transducer 312 illustrated in FIGS. 30-34 can be more sensitive to pressure changes than the capacitive pressure transducer 222 illustrated in FIGS. 26-29.

Alternatively, the capacitive pressure transducer 312 can be made with non-electrically conductive first and second housings 334', 335', for example ceramic, non-conductive metal, or other non-conductive material, as illustrated diagrammatically in FIGS. 35 and 36. Such non-conductive housings 334', 335' can be the same or similar to the housing 252 in the example capacitance pressure transducer embodiment 222 shown diagrammatically in FIGS. 28 and 29. For example, a first electrode 344' in the form of a thin, electrically conductive plate or coating, e.g., a metal ink or film, is formed on or attached to the external surface of the first membrane 338' of the non-electrically conducting first housing 334' to flex or deform in conformance with the first membrane 338' as pressure outside the first housing 334' changes. Similarly, a second electrode 345' in the form of a thin, electrically conductive plate or coating, e.g., a metal ink or film, is formed on or attached to the external surface of the second membrane 339' of the non-electrically conductive second housing 335' to flex or deform in conformance with the second membrane 339' as pressure outside the second housing 335' changes. The first electric conductor 322 of the mineral insulated cable 320 (FIGS. 30-32) is connected electrically to the first electrode 344', and the second electrical conductor 324 is connected electrically to the second electrode 345', so that a voltage applied to the first and second electric conductors 322, 324 a capacitance 342 across the distance D between the first and second electrode 344', 3"45' that varies as a function of pressure change outside of the first and second housings 334', 335' as explained above and illustrated by the arrows 341 in FIG. 36. The optional spacer 340 positioned between the peripheral, interfacing surfaces of the first and second housings 334', 335' sets the distance D and provides support, thus structural stability to the capacitive pressure transducer 312 as explained above.

As an alternative to the spacer 340, the capacitive pressure transducer 312 can be provided with a potting or coating 346 to maintain the distance D and provide the support and structural integrity for the ceramic first and second housings 334', 335', as illustrated diagrammatically in FIG. 37, or for the housings 334, 335 in FIGS. 30-34 if desired. Where the housings 334', 335' are ceramic or made of another material that may be vulnerable to corrosive fluids, the potting or coating 346 can also provide corrosion protection for such components. For example, a gold plated metal coating 346 can provide protection against oxidation or other chemical reactions. Of course, some opening or passageway 348 has to be provided to expose the space between the first and second membranes 338', 339' to ambient pressure outside of the capacitive pressure transducer 312 to enable the membranes 338', 339' to flex or deform under varying pressures outside of the transducer 312.

Figure 40:
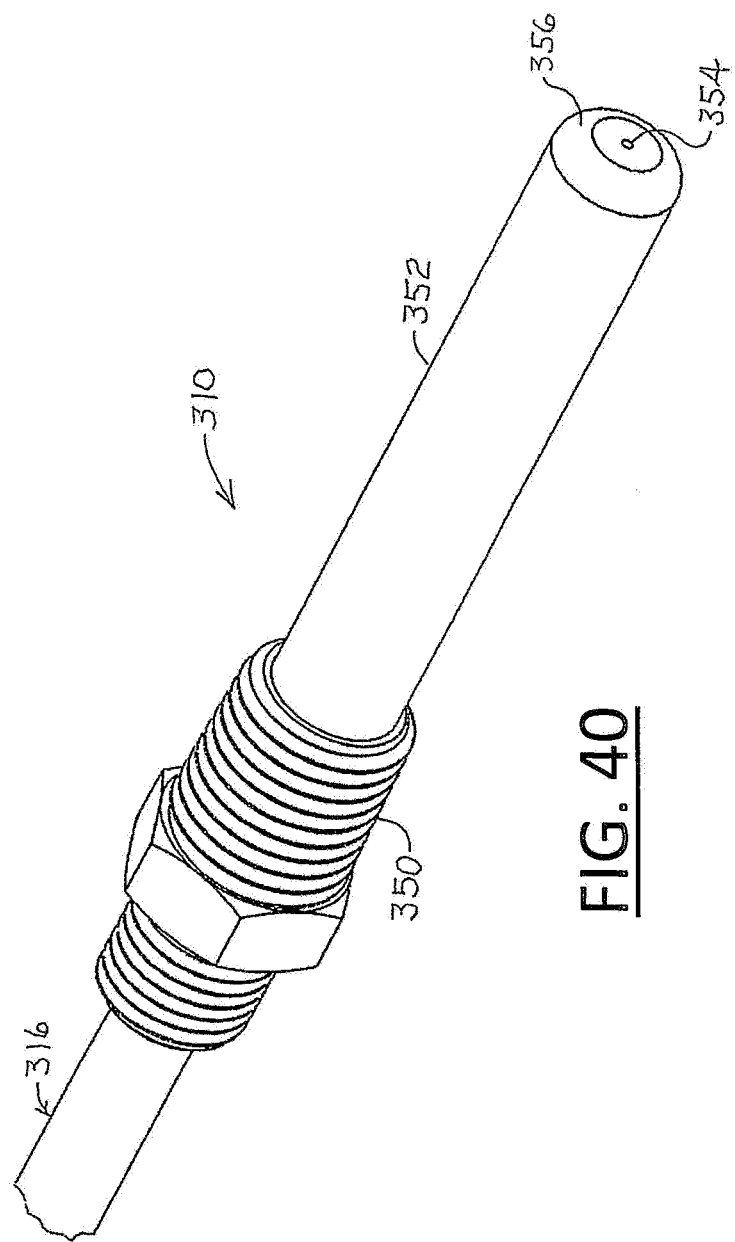
FIG. 40 is an isometric view of the capacitive pressure sensor similar to FIGS. 38 and 39 equipped with a protective sheath.

The example capacitive pressure sensor 310 described above is illustrated in FIGS. 38 and 39 mounted in a fitting 350 that can be screwed into a mating fitting (not shown) in a pressure or fluid-containing vessel (not shown) in such a manner that the capacitive pressure transducer 312 can be positioned inside the pressure or fluid-containing vessel, where the capacitive pressure transducer 312 is exposed to a fluid, the pressure of which is to be measured or monitored, inside the vessel, while the remainder of the probe 316, including the electronics encasement 318, are positioned outside of the vessel. In FIG. 40, the capacitive pressure sensor 310 is illustrated with an optional sheath or shield 352 mounted in the fitting 350 around the capacitive pressure transducer 312, which is hidden by the shield 352. The optional shield 352 may be used, for example, to protect the capacitive pressure transducer 312 from objects or debris in the vessel that could damage the capacitive pressure transducer 312. The shield 352 has a hole 354 in its distal end 356 to expose fluid and the capacitive pressure transducer 312 inside the shield 352 to the same pressures as the fluid outside of the shield 352.

Figure 41:
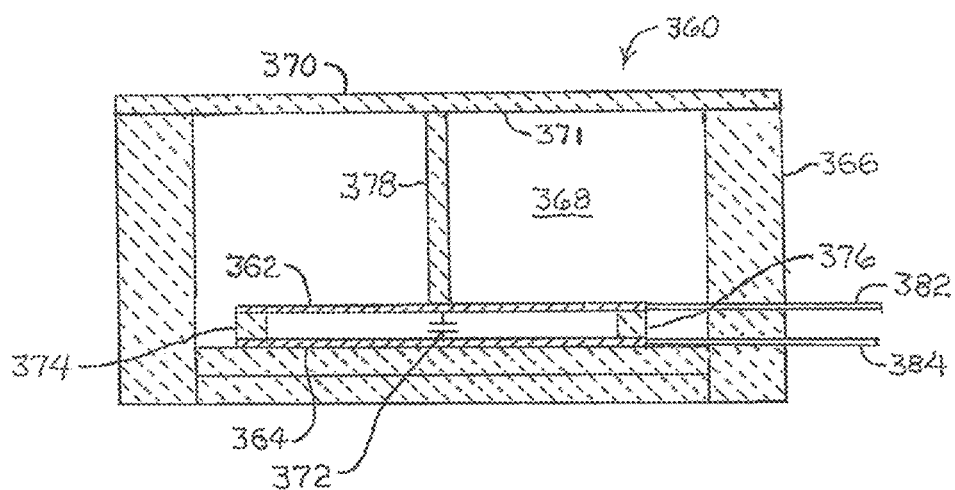
FIGS. 41 and 42 are diagrammatic views of alternate capacitive pressure transducers.
Figure 42:
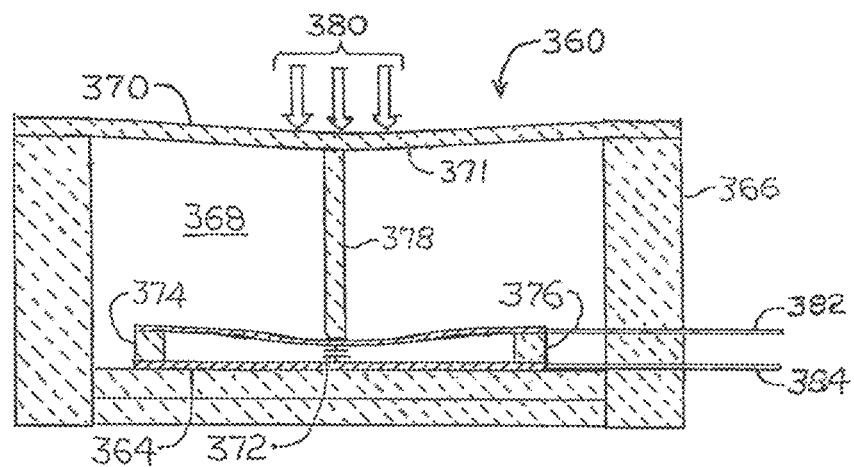

Another example capacitive pressure transducer 360 illustrated in FIGS. 41 and 42 isolates the capacitor electrodes 362, 364 from fluids outside of the capacitive pressure transducer 360, which may be beneficial, for example, in situations where the fluid pressure to be measured or monitored involves a corrosive fluid and there is a need or desire to use capacitor electrodes 362, 364, wires, and other electrical components made of materials that maximize or enhance the electrical properties of the capacitor regardless of the abilities of such materials to resist corrosion. The example capacitive pressure transducer 360 in FIGS. 41 and 42 comprises a housing 366 that encloses and hermetically seals a space 368. A side of the housing 366 comprises a resiliently deformable or flexible membrane 370 that will deform or flex in response to pressure changes outside of the housing 366 in a pressure range to be measured or monitored with the capacitive pressure transducer 360. The housing 366 and the membrane 370 comprise a material that is corrosion resistant. The capacitor (indicated by the capacitor symbol 372) is formed by a first electrode 362 and a second electrode 364 positioned inside the enclosed space 368 and held apart from each other by one or more standoff supports, e.g., standoff supports 374, 376. At least one of the electrodes, e.g., first electrode 362, is resiliently deformable or flexible toward and away from the second electrode 364. A pusher 378, e.g., a pole, strut, or nub, in the enclosed space 368 extends from the inside surface 371 of the membrane 370 to the first electrode 362. Therefore, when an external pressure (indicated in FIG. 42 by the pressure arrows 380) on the membrane 370 causes the membrane 370 to deform or flex toward the first electrode 362, the pusher applies a force to the first electrode 362 that deforms or flexes the first electrode toward the second electrode 364, thereby changing the capacitance between the first and second electrodes 362, 364, Such change in capacitance is detectable on the lead wires 382, 384 that are electrically connected, respectively, to the first electrode 362 and second electrode 364.

Figure 43:
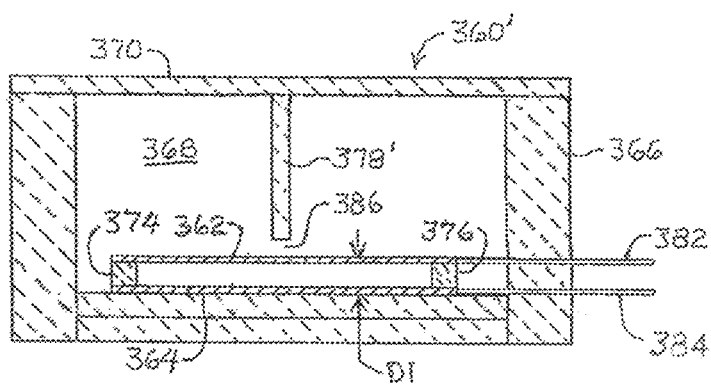
FIGS. 43-45 are diagrammatic views of another alternate capacitive pressure transducer with a pressure offset feature.
Figure 44:
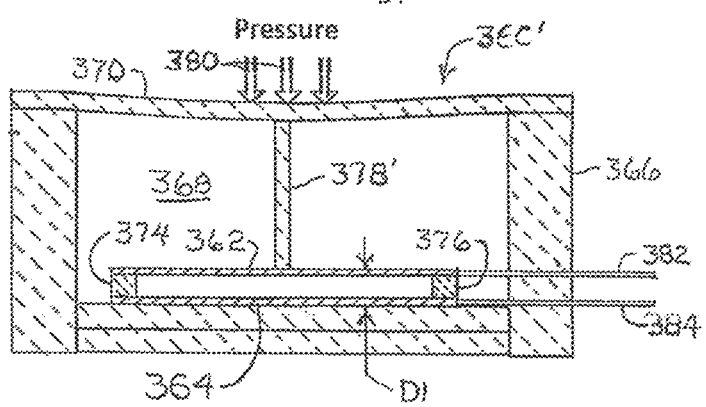
Figure 45:
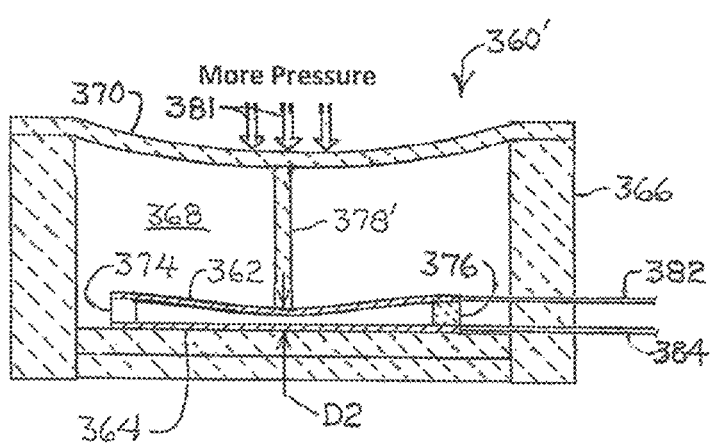

Another example capacitive pressure transducer 360' illustrated in FIGS. 43-45 is a modification of the example capacitive pressure transducer 360 in FIGS. 41 and 42. Essentially, the capacitive pressure transducer 360' can be the same as the capacitive pressure transducer 360, except for the pusher 378', which in the capacitive pressure transducer 360' does not extend all the way to the first electrode 360 in the entire pressure range of the fluid outside the housing 366 for which pressure is to be measured. As shown diagrammatically in FIG. 43, at the particular pressure outside the housing 366 that exists in this illustration, the pusher 378' does not extend all the way from the membrane 370 to the first electrode 360, thus leaving a gap 386 between the pusher 378 and the first electrode 362. That outside pressure, for example, could be the same as the pressure inside the space 368, so that there is no differential pressure between the outside of the housing and the inside of the housing, or there could be a differential pressure, but not enough to cause significant deformation or flexing of the membrane 370. In that condition, there is a distance D1 between the first and second electrodes 362, 364 and a capacitance between the first and second electrodes 362, 364 associated with that distance D1.

In FIG. 44, the example capacitive pressure transducer 360' is illustrated with just enough pressure 380 outside the housing 366 to cause the membrane 370 to deform or flex inwardly enough to move the distal end of the pusher 378 into contact with the first electrode 362, thus eliminating the gap 386 between the pusher 378 and the first electrode 362. In that condition, the distance D1 between the first and second electrodes 362, 364 is still the same as in FIG. 43, so the capacitance between the first and second electrodes 362, 364 remains unchanged, i.e., no response on lead wires 382, 384 from that pressure change, as illustrated by the flat graph line 388 in the graph in FIG. 46.

Figure 46:
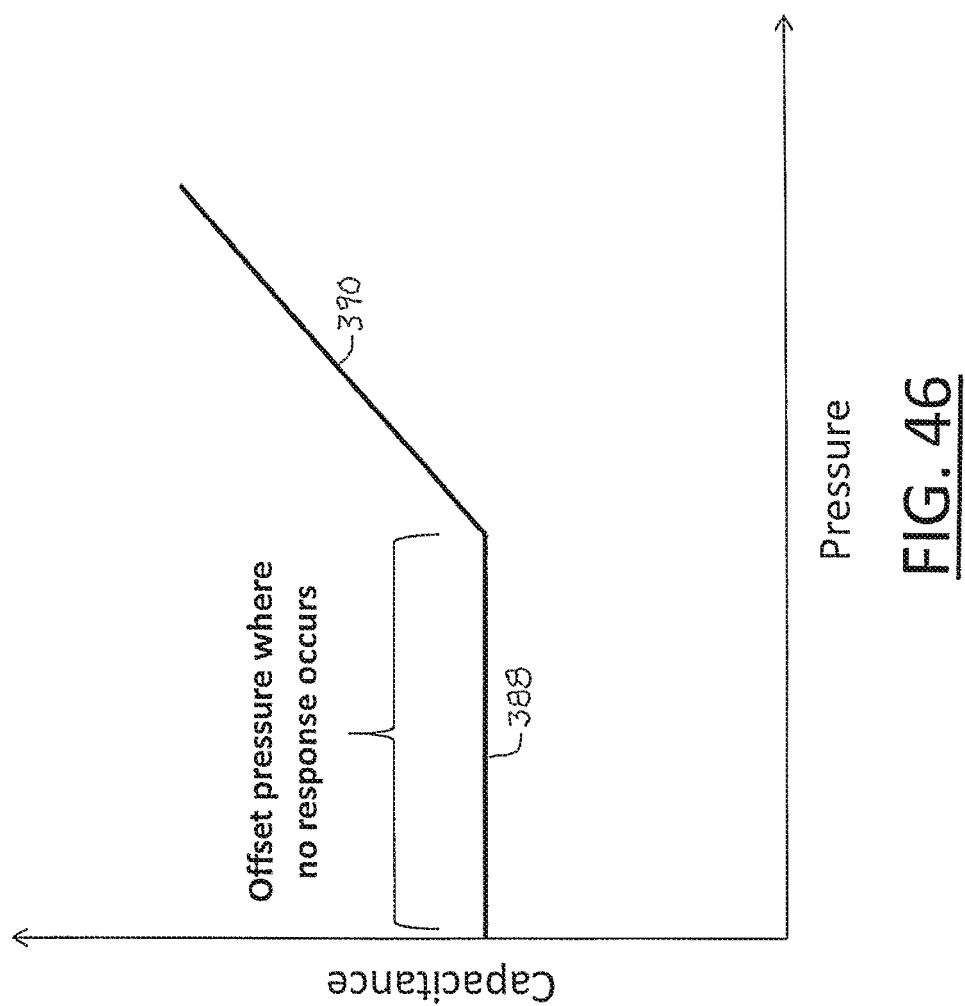
FIG. 46 is a graphical illustration of the offset feature of FIGS. 43-45.

Then in FIG. 45, the example capacitive pressure transducer 360' is illustrated with even more pressure 381 outside the housing 366, thus causing the membrane 370 deform or flex even more. That additional deformation or flex in the membrane 370 causes the pusher 378 to push the first electrode 362 toward the second electrode 364, thereby decreasing the distance between the first and second electrodes 362, 364 to a smaller distance D2 as illustrated in FIG. 45. That change in the distance between the first and second electrodes 362, 364 from D1 in FIGS. 43 and 44 to the smaller D2 in FIG. 45 causes the capacitance between the first and second electrodes 362, 364 to increase as illustrated by the inclined graph line 390 in FIG. 46. This structure and resulting function of the capacitive pressure transducer 360' in FIGS. 43-45 allows for the pressure-capacitance response to include a pressure offset as illustrated in FIG. 46 or a pressure range that must be reached before the capacitance of the sensor changes. This feature can be used, for example, to measure pressures in environments or vessels where the desired pressure measurement range is small and offset from null.

Figure 47:
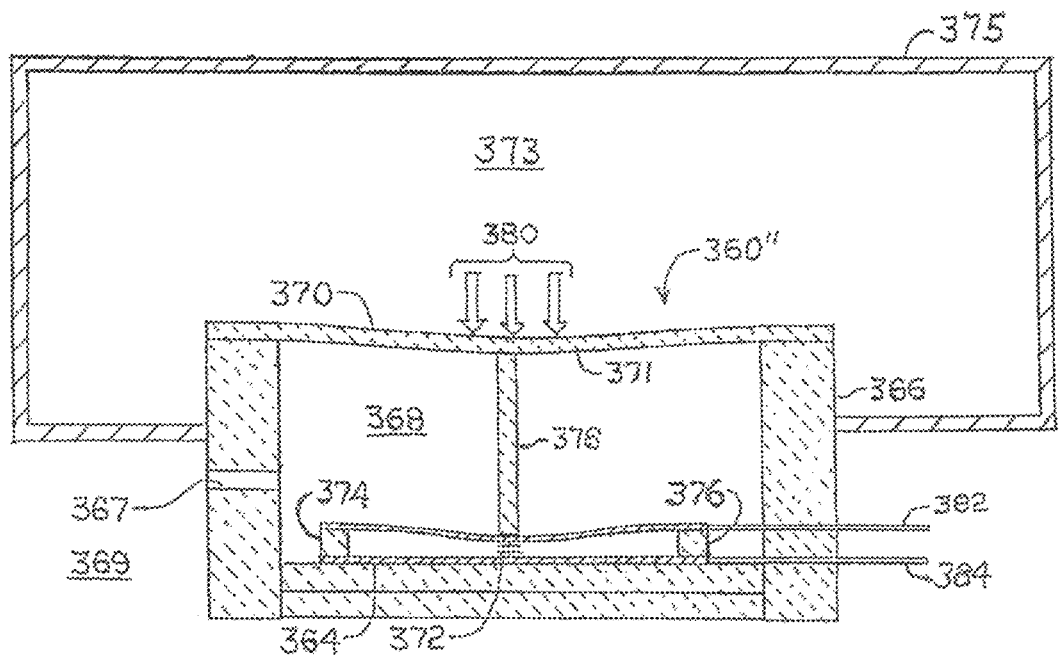
FIGS. 47 and 48 are diagrammatic views of an example alternate capacitive pressure transducer that is a variation of the capacitive pressure transducer illustrated in FIGS. 41 and 42.

Another example capacitive pressure transducer 360" shown in FIGS. 46 and 47 is similar to the capacitive pressure transducer 360' of FIGS. 41 and 42, but the space 368 is in communication with a reference pressure outside of the housing 366. For example, the space 368 in the housing 366 is shown diagrammatically in FIG. 46 as being connected by an aperture 367 to the ambient atmosphere 369 outside of the housing 366, while the external surface of the flexible membrane 370 is exposed to the pressure 380 that is being sensed or measured. In FIG. 46, the pressure 380 is in a chamber 373 illustrated diagrammatically as the interior of an enclosure 375. Accordingly, a pressure measurement provided by the example capacitive pressure transducer 360" in FIG. 46 is a differential pressure between the pressure 380 in the chamber 373 and the ambient atmosphere 369.

Figure 48:
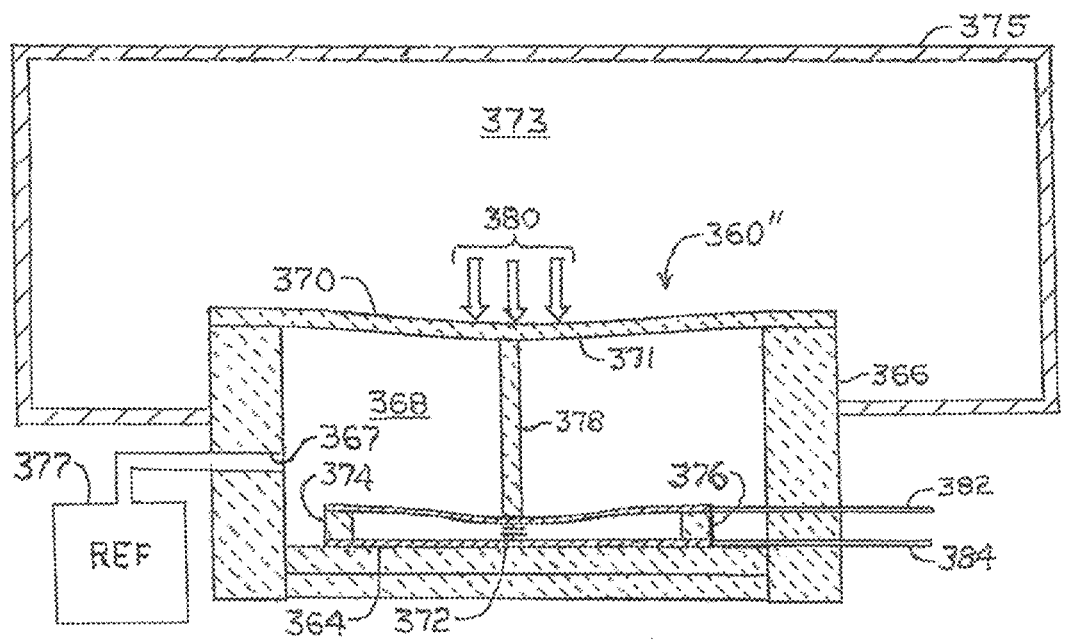

In FIG. 47, the example capacitive pressure transducer 360 is shown with the space 368 connected by the aperture 367 to a different reference pressure (REF) illustrated diagrammatically by the block 377. Accordingly, in FIG. 47, a pressure measurement provided by the example pressure transducer 360" is a differential pressure between the pressure 380 in the chamber 373 and the reference pressure (REF), The reference pressure features illustrated diagrammatically in FIGS. 47 and 47, e.g., the aperture 367, REF pressure 377, and chamber 373, can also be applied to the capacitive pressure transducer 312 in FIGS. 30-40 and to the alternative capacitive pressure transducers 360' in FIGS. 43-45, as will be understood by persons skilled in the art once they become familiar with the capacitive pressure transducers 360" described above and illustrated diagrammatically in FIGS. 47 and 48.

Figure 53:
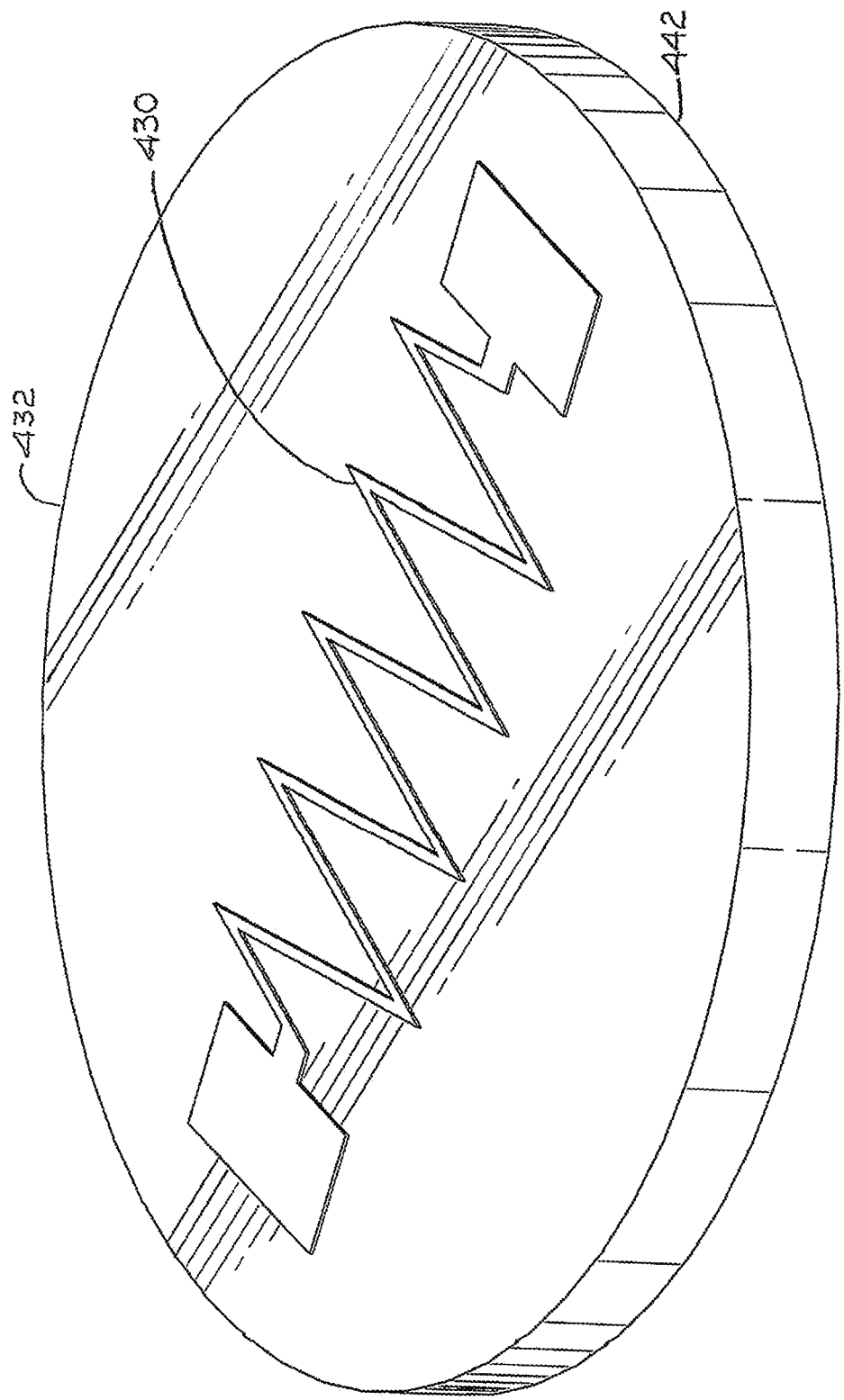
FIG. 53 is an enlarged isometric view of the thermal resistive element on the ceramic substrate of the flow meter sensor of FIG. 49.

An example rotation-insensitive flow meter sensor 410 that can withstand and function in very high temperature fluids is illustrated in FIGS. 49-53. Rotation-insensitive in this description means essentially that the flow measurement outputs of this example flow meter are not sensitive to the rotational orientation of the meter with respect to the direction of flow of the fluid. The example flow meter sensor 410 has a flow transducer 412 mounted on a distal end 414 of a probe 416, which comprises a mineral insulated cable 418 with a plurality of electric conductors, e.g., the four electric conductors 420, 422, 424, 426 illustrated in FIGS. 49, 50, and 52. As best seen in FIGS. 52 and 53, the example flow transducer 412 comprises a sensing element 430 on a ceramic substrate 432 mounted in a housing 434 made of materials, either ceramic or metal, that can withstand the high temperatures of the fluid for which flow rate is to be measured with flow meter sensor 410. In the example flow transducer 412 in FIGS. 49-52, the housings 434 includes a base component 436 mounted on the distal end 414 of the probe 416 and a mounting ring 438 for mounting the ceramic substrate 432 on the distal end of the flow meter sensor 410 substantially in a plane perpendicular to the longitudinal axis 440 of the probe 416. The sensing element 430 is an electrically resistive material, the resistivity of which varies as a function of temperature. Many of such temperature-dependent resistive materials are commercially available from myriad manufacturers and distributors, including metallic inks and other metals and alloys that can be printed, deposited, or otherwise placed on the ceramic substrate 432 to form the sensing element 430, for example platinum, gold, or other thermal resistive metals that can withstand the high temperatures of the fluid for which flow rate is being measured, including any such metals or other thermal resistive materials as described above.

In operation, the probe 416 and flow transducer 412 are positioned in the flowing fluid to measure the flow rate of the fluid. Accordingly, the fluid flows over the exposed surface 442 of the ceramic substrate 432 as indicated by the flow arrow 444 in FIGS. 49 and 51. At the same time, a voltage is applied across the sensing element 430 on the internal surface 443 of the ceramic substrate 430 by connecting the electric conductors 420, 422 in the probe 416 to a voltage source (not shown). The voltage causes an electric current flow through the thermal resistive sensing element 430, which creates heat. The heat created in the thermal resistive sensing element is conducted by the ceramic substrate 432 from the internal surface 443 to the exposed external surface 443, which is in contact with the flowing fluid 444, The flowing fluid 444 conducts heat away from the ceramic substrate 432, thus also from the thermal resistive sensing element 430, i.e., cools the resistive sensing element 430. The cooling of the resistive sensing element 430 changes the electrical resistance of the thermal resistive sensing element 430, which changes the voltage across or current flow through the resistive sensing element 430. Such changes can be detected and measured as is well understood by persons skilled in the art. The higher the flaw rate of the flowing fluid 444, the more heat is conducted away from the ceramic substrate 432 and resistive sensing element 430, all of which can be detected as a result of the corresponding changes in resistivity of the thermal resistive sensing element 430 as described above in relation to the other example flow meter embodiments.

The housing 434 and ceramic substrate 432 isolate the thermal resistive sensing element 430 from the fluid, which may be important if the fluid is electrically conductive or corrosive to the thermal resistive sensing element 430. The mounting ring 438 is preferably a thermal insulating material to prevent heat produced by the thermal resistive sensor element 430 from being conducted into the housing 434 and probe 416 instead of being conducted away by the flowing fluid 444, which would adversely affect the sensitivity and accuracy of the flow rate measurements obtainable with the flow meter sensor 410 as well as power consumption by the resistive sensor element 430. Other bands of thermal insulating material (not shown) can also be included for this purpose between the ceramic substrate 432 and the rest of the housing 434 or probe 416. Also, fluid flow 444 in any direction that is perpendicular to the longitudinal axis 440 of the probe 416, i.e., which is parallel to the exposed surface 442 of the ceramic substrate 432, will conduct heat away from the ceramic substrate 432 as effectively as fluid flow in any other direction that is perpendicular to the longitudinal axis 440. Therefore, unlike the flow meter embodiment in FIGS. 22-24, flow rate measurements with the flow meter sensor 410 in FIGS. 49-52 are not dependent on any particular rotational orientation of the flow meter sensor 410, as long as the fluid flow is substantially perpendicular to the longitudinal axis 440, thus substantially parallel to the exposed surface 442 of the ceramic substrate 432, One or more temperature sensor(s) 446, for example, thermocouples or other heat sensors, are mounted in the housing 434 to measure the ambient temperature of the flowing fluid for temperature corrections due to sensitivity of the thermal resistive sensor element 430 as is understood by persons skilled in the art. The thermal insulating ring 438 also inhibits heat produced by the thermal resistive sensor element 430 from affecting temperature measurements by the temperature sensors 446, which are important for obtaining accurate flow rate measurements with corrections for temperature effects.

Another example rotation-insensitive flow meter sensor 450 shown in FIGS. 54-57 is much the same as the example rotation-insensitive flow meter sensor 410 in FIGS. 49-52, except additional protection is provided for the ceramic substrate 432 that holds the thermal resistive sensor element 430, which can be the same as the thermal resistive sensor element 430 in FIGS. 50 and 53. For example, as best seen in FIG. 57, the ceramic substrate 432 of the flow rate transducer 452 is brazed to a metal end plate or cladding 454, which is joined (by welding, for example) to a thermal insulating metal ring 456 that is part of the housing 458. The base component 460 of the housing 458 is a cylindrical metal sleeve on which the insulating metal ring 454 is mounted. Accordingly, all parts of the flow rate transducer 452 which are exposed to the fluid are metals that can withstand the very high temperatures of the fluid in which the flow meter sensor 450 is to be used and resistant to corrosion by the fluid in which the flow meter sensor 450 is to be used. The metal end plate 454 is a good thermal conductor for efficient conduction of heat produced by the thermal resistive sensor element 430 to the fluid flowing on or over the metal end plate 454, for example, molybdenum, a thermally conductive stainless steel, or thermally conductive nickel alloy. The base component 460 of the housing 458 is also a good thermal conductor metal to conduct heat from the fluid to the temperature sensor 462, for example, a thermocouple or other temperature sensor device, mounted in the base component 460, to provide an accurate measure of ambient fluid temperature. The ring 456, however, is a thermally insulating metal to prevent heat produced by the thermal resistive sensor element 430 from being conducted into or through the probe 464 instead of through the metal end plate 454 and into the fluid flowing on or over the metal end plate 454. Accordingly, the ceramic substrate 432 is not in contact with the fluid of which the flow rate is to be measured, which is important if the fluid is corrosive to the ceramic substrate 430 and if there are chunks of hard material flowing in the fluid that could break the ceramic substrate 430. The electric conductors 420, 422 of the mineral insulated cable 466 are connected to opposite ends of the thermal resistive sensor element 430, and the electric conductors 424, 426 are connected to the temperature sensor 462 as in the previously discussed flow meter sensor 410 in FIGS. 49-52.

Figure 58:
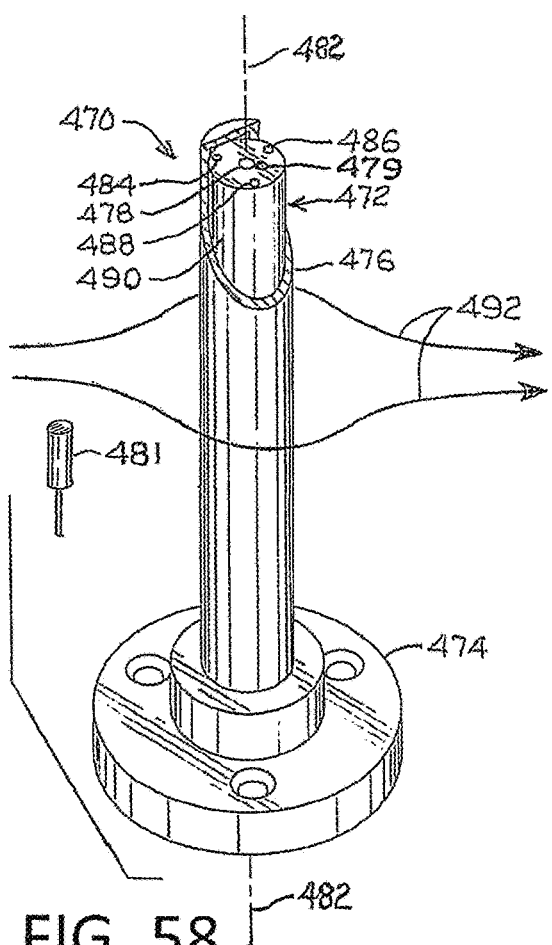
FIG. 58 is an isometric view of an example fluid flow sensor for detecting mass flow rate and flow direction.
Figure 59:
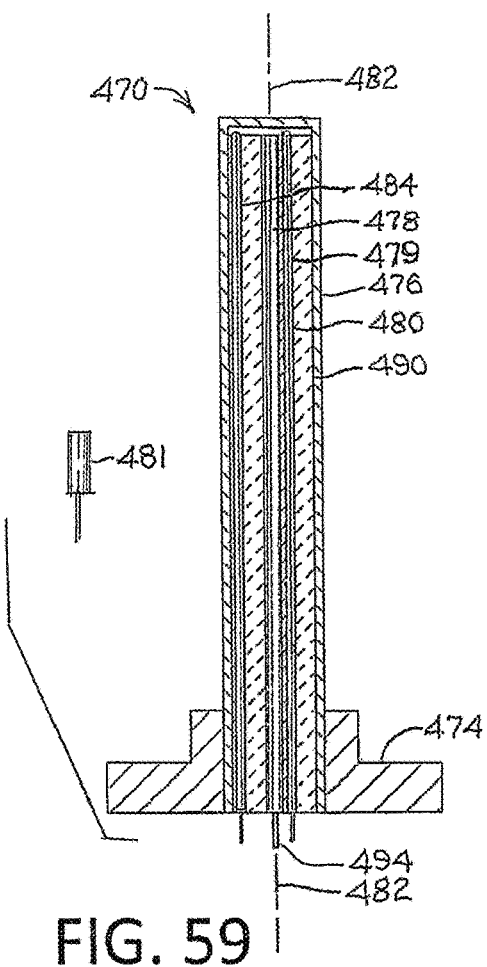
FIG. 59 is an enlarged cross section view of the example fluid flow sensor of FIG. 58.
Figure 60:
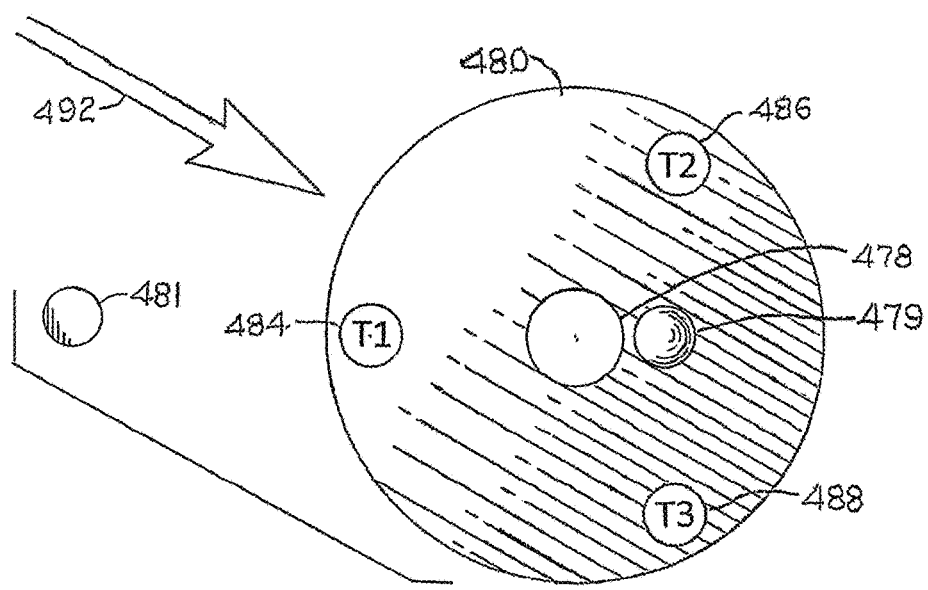
FIG. 60 is an enlarged distal end view of the flow transducer of the example fluid flow sensor of FIG. 58.

An example fluid flow sensor 470 for detecting mass flow rate as well as flow direction, including fluid flows in very harsh environments, e.g., very high heat, corrosive fluids, etc., is illustrated in FIGS. 58-60. With primary reference initially to FIGS. 58 and 59 the fluid flow detector 470 comprises a directional flow transducer 472 mounted on a base 474 and optionally enclosed in a protective sheath 476. A portion of the sheath 476 is cut away in FIG. 58 to reveal a portion of the flow transducer 472. The flow transducer 472 comprises a heater 478 in the center of a core material 480. At least three temperature sensors 484, 486, 488 are located on or near the peripheral surface 490 of the core material 480 and spaced apart angularly in relation to each other around the core material 480 and radially outward from the heater 478. Such temperature sensors can be thermocouples, resistance temperature detectors, or other commercially available temperatures that can withstand the temperatures in which the flow is to be measured, and such temperature detectors are available commercially in a variety of shapes and sizes, as is well-known to persons skilled in the art, thus need not be described in more detail here. In one example embodiment illustrated in FIGS. 58-60, the directional flow transducer 470 comprises a cylindrical core material 480, and the heater 478 is a tubular heater that extends coaxially along a longitudinal axis 482 of the cylindrical core material 480, Such tubular heaters are available commercially in a variety of sizes and with a variety of heating components, thus need not be described in more detail here. The core material 480 can be a potting material, a metal, or any other heat conductive material.

In operation, the flow sensor 470 is placed in a flow of fluid, for example, in a wind, flowing gas, or flowing liquid, as indicated by the wind flow arrows 492 in FIG. 58. Electric current is provided to the heater 478 via the electric cord 494, and heat produced by the heater 478 spreads radially outward from the heater 478 by conduction through the core material 480. If no cooling wind is present, all of the temperature sensors 484, 486, 488 will read the same temperature, assuming all of the temperature sensors are the same radial distance from the heater 478. However, if there is a wind present, as illustrated diagrammatically in FIG. 59, more of the heat in the core material 480 will be conducted away by the wind on the windward side of the core material 480 than on the leeward side, Therefore, the windward side of the core material 480 will be cooler than the leeward side, and the temperature sensor(s) on the windward side will have lower readings than the temperature sensor(s) on the leeward side, while temperature sensor(s) between the windward side and the leeward side will have temperature readings higher than temperature sensors on the windward side and lower than temperature sensors on the leeward side, as illustrated by the temperature T1 of the temperature sensor 484, the temperature T2 of the temperature sensor 486, and the temperature T3 of the temperature sensor 486 in FIG. 60. The difference between the lowest temperature reading and the temperature of the heat source (i.e., at the heater 478) can be correlated to flow rate, and the differences among the plurality of temperature sensors 484, 486, 488 can be correlated to flow direction. An additional temperature sensor 479 can be placed in close proximity to, or integrated into, the heater 478 for measuring the temperature at the heater 478. Another temperature sensor 481 can be placed external to the flow transducer 472 in the flowing fluid 492 for measuring ambient temperature of the flowing fluid 492 for use as a reference for determining an accurate flow rate. Temperature measurements from either the temperature sensor 479 or the temperature sensor 481 can be used in flow rate calculations along with the temperature measurements with the temperature sensors 484, 486, 488, because flow rate calculations are based on a temperature differential between the temperature sensors 484, 486, 488 and a reference temperature, and the reference temperature can be the temperature at the heater 478 (e.g., measured by the temperature sensor 479) or the temperature of the flowing fluid 492 (e.g., measured by the temperature sensor 481).

As mentioned above, the core material 480 can be a potting material, a ceramic, a metal, or other material that is a good heat conductor material. The core material 480 will conduct heat efficiently from the heater 478 radially outward to the peripheral surface 490 of the core material 480 to be dissipated into the flowing fluid (e.g., wind, flowing gas, or flowing liquid) and thereby differentially cool more on the windward side than on the leeward side. Choice of material for the core material 480 may be based on particular application conditions, including, for example, temperature range, range of flow rates to be measured, and fluid properties such as density and thermal conductivity. Some suitable materials include ceramics (for example, aluminum oxide or magnesium oxide) and metals (for example, stainless steels, silver, copper, aluminum, and nickel alloys).

The optional sheath 476 can be provided to protect sensitive components, such as the heater 478 and temperature sensors 484, 486, 488, from harsh environment and environmental hazards. For example, the sheath 476 can comprise a metal or ceramic that can withstand the high temperature ranges or corrosive conditions in which the fluid flow sensor 470 is used. The sheath should also comprise a good thermal conductor material so as to efficiently conduct heat from the core material 480 to the flowing fluid (e.g., wind, flowing gas, or flowing liquid) that contacts the external surface of the sheath 476.

The example fluid flow sensor 470 illustrated in FIGS. 58-60 can only sense flow rate and flow direction in the 2-dimensional plane that is normal to the longitudinal axis 482 of the sensor, but the operative concept and principles also apply to 3-dimensional flow. For example, a heat source (e.g., heater) in the middle of a spherical core material (not shown) with multiple sensors dispersed at regular intervals around the spherical core material could be used to sense flow rate and flow direction in a 3-dimensional manner.

Persons skilled in the art can provide electric circuits and equipment for powering the heater 478 and for reading temperatures from the temperature sensors 484, 486, 488 and can select appropriate core materials for particular applications (e.g., operating temperature ranges, fluid flow rate ranges, corrosiveness of flowing fluids, etc.) without undue experimentation, once they understand the principles explained above. Also, particular flow rates and directions for particular flowing fluids to be measured with particular core materials, particular temperature sensors, and particular heaters and heater capacities can be calibrated empirically as will be understood by persons skilled in the art once they understand the principles explained above.

The foregoing description provides examples that illustrate the principles of the invention, which is defined by the claims that follow. The temperature, pressure, and flow rate detecting embodiments described above and shown in the drawings are examples, but not the only embodiments, that can be used with the sensor probe, core, and other structures described above. Once persons skilled in the art understand the principles of this invention, such person will recognize that still other embodiments of temperature, pressure, flow, and liquid level transducers or sensors as well as other types can also be used. Since numerous insignificant modifications and changes will readily occur to those skilled in the art once they understand the invention, it is not desired to limit the invention to the exact example constructions and processes shown and described above. Accordingly, resort may be made to all suitable combinations, subcombinations, modifications, and equivalents that fall within the scope of the invention as defined by the claims. The words "comprise," "comprises," "comprising," "include," "including," and "includes" when used in this specification, including the claims, are intended to specify the presence of stated features, integers, components, or steps, but they do not preclude the presence or addition of one or more other features, integers, components, steps, or groups thereof. Also, directional terms, such as "upwardly," "downwardly," "on," "off," "over," "under," "above," "below," etc., may and sometimes do relate to orientation of components and features as illustrated in the drawing sheets, and are not used to require any particular physical orientation or any limitation on orientation of the device or component in actual use.

The invention claimed is:

1. A sensor device for sensing pressure of a very high temperature fluid, comprising:
    a transducer comprising a first pressure sensitive element and a second pressure sensitive element;
    wherein the first pressure sensitive element comprises a first housing that encloses and hermetically seals a first space, one side of the first housing including a resiliently deformable and electrically conductive first membrane;
    wherein the second pressure sensitive element comprises a second housing that encloses and hermetically seals a second space, one side of the second housing including a resiliently deformable and electrically conductive second membrane; and
    wherein the first pressure sensitive element and the second pressure sensitive element are positioned adjacent to each other with the first membrane and the second membrane positioned in juxtaposed relation to each other a spaced distance apart from each other so as to form a capacitor.

2. The sensor device of claim 1, wherein the first housing, including the first membrane, comprises an electrically conductive metal or metal alloy that can withstand very high temperatures, and the second housing, including the second membrane, comprises an electrically conductive metal or metal alloy that can withstand very high temperatures.

3. The sensor device of claim 1, wherein the first housing comprises a ceramic material that can withstand very high temperatures and the first membrane comprises an electrically conductive metal or metal alloy that can withstand very high temperatures, and wherein the second housing comprises a ceramic material that can withstand very high temperatures and the second membrane comprises an electrically conductive metal or metal alloy that can withstand very high temperatures.

4. The sensor device of claim 3, wherein the first membrane comprises a ceramic material that can withstand very high temperatures and an electrically conductive metal or metal alloy plate or coating, which can also withstand very high temperatures, formed on or attached to an external surface of the first membrane, and wherein the second membrane comprises a ceramic material that can withstand very high temperatures and an electrically conductive metal or metal alloy plate or coating, which can also withstand very high temperatures, formed on or attached to an external surface of the second membrane.

5. The sensor device of claim 1, including a spacer positioned between respective peripheral, interfacing surfaces of the first and second housings.

6. The sensor device of claim 5, wherein the spacer comprises a putty or potting material.

7. A capacitive pressure transducer, comprising:
a housing that encloses a space, a side of the housing comprising a resiliently deformable or flexible membrane that deforms or flexes in response to pressure changes outside of the housing in a pressure range to be measured or monitored, wherein the housing and the membrane comprise a material that is corrosion resistant;
a capacitor formed by a first electrode and a second electrode positioned inside the enclosed space and held apart from each other by one or more non-electrically conductive stand-off supports, the first electrode being resiliently deformable or flexible toward or away from the second electrode; and
a pusher in the enclosed space that extends from the membrane toward the first electrode.

8. The capacitive pressure transducer of claim 7, wherein the pusher extends from the membrane to the first electrode.

9. The capacitive pressure transducer of claim 7, wherein the enclosed space is in fluid-flow communication with a reference pressure outside of the enclosed space.

10. A method of measuring pressure of a very high temperature fluid, comprising:
placing a transducer in the fluid, wherein the transducer comprises: (i) a first pressure sensitive element, wherein the first pressure sensitive element comprises a first housing that encloses a first space, and wherein one side of the first housing includes a resiliently deformable and electrically conductive first membrane; and (ii) a second pressure sensitive element disposed adjacent to the first pressure sensitive element, wherein the second pressure sensitive element comprises a second housing that encloses a second space, and wherein one side of the second housing includes a resiliently deformable and electrically conductive second membrane, and further, wherein the second pressure sensitive element is positioned and oriented such that the second membrane is juxtaposed to the first membrane with a distance between the first membrane and the second membrane;
applying a voltage across the first membrane and the second membrane;
measuring capacitance between the first membrane and the second membrane; and
determining the pressure of the fluid by comparing the capacitance to a predetermined correlation of capacitance measurements to pressures.

11. A flow meter sensor for sensing flow of a high temperature fluid, comprising:
a transducer comprising a housing that encloses a space, said housing comprising a material that can withstand high temperatures of the fluid for which flow is sensed, including one side of the housing comprising a ceramic substrate with a surface outside of the housing and another surface that is inside the housing;
a sensor element mounted on the surface of the ceramic substrate that is inside the housing, said sensor element comprising an electrically resistive material, the resistivity of which varies as a function of temperature, and which can withstand the high temperatures of the fluid for which flow is sensed;
a sensor element mounted to the housing, said sensor element comprising a temperature-sensitive set of materials which can withstand the high temperatures of the fluid for which flow is sensed.

12. The flow meter sensor of claim 11, wherein the material of the housing is ceramic.

13. The flow meter sensor of claim 11, wherein the transducer is mounted on a distal end of a probe that has a longitudinal axis, the ceramic substrate being positioned in a plane that is substantially perpendicular to the longitudinal axis of the probe.

14. A flow meter sensor for sensing flow of a high temperature fluid, comprising:
a transducer comprising a housing that encloses a space, said housing comprising a corrosion resistant material that can withstand high temperatures of the fluid for which flow is sensed, including one side of the housing comprising a ceramic substrate with a surface outside of the housing and another surface that is inside the housing, and a plate or cladding comprising a corrosion resistant material that can withstand the high temperatures of the fluid for which flow is to be sensed with the flow meter sensor; and
a sensor element mounted on the surface of the ceramic substrate that is inside the housing, said sensor element comprising an electrically resistive material, the resistivity of which varies as a function of temperature, and which can withstand the high temperatures of the fluid for Which flow is sensed;
a sensor element mounted to the housing, said sensor element comprising a temperature-sensitive set of materials which can withstand the high temperatures of the fluid for which flow is sensed.

15. The flow meter sensor of claim 14, wherein the corrosion resistant material comprises a metal or metal alloy that can withstand the high temperatures of the fluid for which flow is to be sensed with the flow meter sensor.

16. A fluid flow sensor for detecting mass flow rate and flow direction of a fluid flow, comprising:
a heater positioned in a core material that has a longitudinal axis and a peripheral surface; and
at least three temperature sensors located at or near the peripheral surface of the core material and spaced apart angularly in relation to each other around the heater and spaced radially outward from the heater.

17. The fluid flow sensor of claim 16, wherein the core material is cylindrical and has a longitudinal axis, and wherein the heater is an elongated heater that extends coaxially through the cylindrical core material.

18. The fluid flow sensor of claim 16, wherein the core material is a heat conductive material.

19. The fluid flow sensor of claim 16, wherein the core material is a material that can withstand very high temperatures.

20. The fluid flow sensor of claim 19, wherein the core material comprises a ceramic.

21. The fluid flow sensor of claim 19, wherein the core material comprises a metal.

22. The fluid flow sensor of claim 16, including a protective sheath around the peripheral surface of the core material.

23. The fluid flow sensor of claim 22, wherein the protective sheath comprises a material that can withstand highly corrosive fluids for which flow is to be sensed.

24. A method of detecting mass flow rate and flow direction of a fluid, comprising:

positioning a core material in the flowing fluid, the core material having a peripheral surface and a center;

producing heat in the core material with a heater positioned at the center of the core material;

measuring temperatures at each of at least three locations at or near the peripheral surface of the core material with at least three temperature sensors positioned respectively at the three locations, wherein the three temperature sensors are spaced apart angularly in relation to each other and radially outward from the heater; and indicating windward direction of the flowing fluid in relation to the core material as a side of the core material on which the temperature measurements are lower than the temperature measurements on other sides of the core material.

25. The method of claim 24, including measuring temperature at the heater and determining mass flow rate as a function of a difference between temperature of the heater and the lowest temperature reading from the temperature sensors.

\* \* \* \* \*